US012563133B2

(12) United States Patent
Cheng et al.

(10) Patent No.: US 12,563,133 B2
(45) Date of Patent: Feb. 24, 2026

(54) POINT-TO-POINT DATABASE SYNCHRONIZATION OVER A TRANSPORT PROTOCOL

(71) Applicant: HUAWEI TECHNOLOGIES CO., LTD., Shenzhen (CN)

(72) Inventors: Dean Cheng, Santa Clara, CA (US); Norman Finn, Santa Clara, CA (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 316 days.

(21) Appl. No.: 18/487,530

(22) Filed: Oct. 16, 2023

(65) Prior Publication Data

US 2024/0048645 A1 Feb. 8, 2024

Related U.S. Application Data

(60) Division of application No. 17/066,003, filed on Oct. 8, 2020, now Pat. No. 11,805,193, which is a
(Continued)

(51) Int. Cl.
*H04L 69/40* (2022.01)
*G06F 11/10* (2006.01)
(Continued)

(52) U.S. Cl.
CPC .......... *H04L 69/40* (2013.01); *G06F 11/1004* (2013.01); *G06F 16/235* (2019.01); *G06F 16/27* (2019.01); *H04L 45/026* (2013.01)

(58) Field of Classification Search
CPC .... H04L 45/026; H04L 69/40; G06F 11/1004; G06F 16/235; G06F 16/27
See application file for complete search history.

(56) References Cited

U.S. PATENT DOCUMENTS 4,056,426 A 11/1977 Sipin
6,477,543 B1 11/2002 Huang et al.
(Continued)

FOREIGN PATENT DOCUMENTS

CN 1976336 A 6/2007
CN 102017580 A 4/2011
(Continued)

OTHER PUBLICATIONS

"IEEE P802.1CS Link-Local Registration Protocol Draft 1.3 Introduction", Huawei Technologies Co. Ltd., Mar. 7, 2018.Available on the Internet at URL:https://www.ieee802.Org/1/files/public/docs2018/cs-finn-D1-3-introduction-0318-v01.pdf, total 11 pages.
(Continued)

*Primary Examiner* — Jeong S Park

(57) ABSTRACT

A mechanism includes receiving, at a local node, a Hello message including an application identifier (AppId) and a target link between a target port for a local node and target port for a neighbor node. The local node determines the AppId is associated with an application for performing database synchronization. The local node sets up a local database in memory at the local node as part of a database pair for use by the application, the database pair including a neighbor database at the neighbor node. The local node associates the database pair with the target link. The local node controls synchronization of the local database with the neighbor database via the target link.

24 Claims, 13 Drawing Sheets

Related U.S. Application Data continuation of application No. PCT/CN2019/081640, filed on Apr. 6, 2019.

(60) Provisional application No. 62/782,993, filed on Dec. 20, 2018, provisional application No. 62/655,625, filed on Apr. 10, 2018.

(51) Int. Cl.

| | | |
|---|---|---|
| *G06F 16/23* | (2019.01) | |
| *G06F 16/27* | (2019.01) | |
| *H04L 45/02* | (2022.01) | |

(56) References Cited

U.S. PATENT DOCUMENTS

| | | | | |
|---|---|---|---|---|
| 6,606,694 | B2 | 8/2003 | Carteau | |
| 6,775,236 | B1 * | 8/2004 | Scrandis | H04L 43/00 |
| | | | | 370/244 |
| 7,747,561 | B1 * | 6/2010 | Gupta | H04L 67/1095 |
| 10,594,604 | B1 | 3/2020 | Lohiya et al. | |
| 11,310,350 | B2 | 4/2022 | Sarikaya et al. | |
| 11,805,193 | B2 * | 10/2023 | Cheng | G06F 16/27 |
| 2002/0059279 | A1 | 5/2002 | Kim et al. | |
| 2004/0246902 | A1 * | 12/2004 | Weinstein | H04L 45/03 |
| | | | | 707/E17.032 |
| 2006/0215547 | A1 * | 9/2006 | Koppol | H04L 45/28 |
| | | | | 370/252 |
| 2007/0211623 | A1 * | 9/2007 | Nishioka | H04L 41/0663 |
| | | | | 370/218 |
| 2008/0062862 | A1 * | 3/2008 | Goyal | H04L 45/123 |
| | | | | 370/218 |
| 2008/0304483 | A1 | 12/2008 | Williams et al. | |
| 2009/0116496 | A1 | 5/2009 | Savage et al. | |
| 2009/0116514 | A1 | 5/2009 | Yan et al. | |
| 2009/0177631 | A1 | 7/2009 | Ohwada | |
| 2010/0174863 | A1 | 7/2010 | Cooper et al. | |
| 2010/0228866 | A1 | 9/2010 | Li et al. | |
| 2011/0052190 | A1 * | 3/2011 | Lu | H04Q 11/0062 |
| | | | | 398/43 |
| 2011/0286324 | A1 | 11/2011 | Bellagamba et al. | |
| 2012/0078680 | A1 | 3/2012 | Tharp | |
| 2014/0376562 | A1 | 12/2014 | Zhang | |
| 2015/0095601 | A1 | 4/2015 | Muralimanhar et al. | |
| 2016/0088578 | A1 | 3/2016 | Das et al. | |

FOREIGN PATENT DOCUMENTS

| | | |
|---|---|---|
| CN | 102546427 A | 7/2012 |
| CN | 102831223 A | 12/2012 |
| JP | 2002049517 A | 2/2002 |
| JP | 2011034175 A | 2/2011 |
| JP | 2011227712 A | 11/2011 |
| JP | 2014116688 A | 6/2014 |
| JP | 2015108927 A | 6/2015 |
| JP | 2017224351 A | 12/2017 |
| RU | 2595546 C2 | 8/2016 |

OTHER PUBLICATIONS

Jose Costa-Requena et al ., "Autoconfiguration Mechanism for IP Telephony Location Servers ", IFIP International Federation for Information Processing 2003, total: 12pages.

IEEE Std 802.1AB-2016(Revision of IEEE Std 802.1AB-2009), IEEE Standard for Local and metropolitan area networks—Station and Media Access Control Connectivity Discovery, 146 pages.

"Draft Standa for Local and metropolitan area networks—Link-local Registration Protocol IEEE P802.1CS /01.3," Mar. 2018, 75 pages.

"Draft Standa for Local and metropolitan area networks—Link-local Registration Protocol IEEE P802.1CS /D1.6," Aug. 2018, 141 pages.

"Transmission Control Protocol," RFC 793, Sep. 1981, 91 pages.

"Draft Standard for Local and metropolitan area networks—Link-local Registration Protocol IEEE P802.1CS/D1.4," May 2018, 116 pages.

Information technology Telecommunications and information exchange between systems—Intermediate pystem to Intermediate System intra-domain routeing information exchange protocol for use in conjunction with the protocol for providing the connectionless-mode network service (ISO 8473), International Standard, ISO/IEC 10589, Second Edition Nov. 15, 2002, 210 pages.

Information technology Telecommunications and information exchange between systems—Intermediate pystem to Intermediate System intra-domain routeing information exchange protocol for use in conjunction with the protocol for providing the connectionless-mode network service (ISO 8473), International Standard, ISO/IEC 10589:1992, Technical Corrigendum 1, published May 1, 1993, 8 pages.

Information technology Telecommunications and information exchange between systems—Intermediate pystem to Intermediate System intra-domain routeing information exchange protocol for use in conjunction with the protocol for providing the connectionless-mode network service (ISO 8473), International Standard, ISO/IEC 10589:1992, Technical Corrigendum 2, published Jul. 1, 1996, 2 pages.

Information technology Telecommunications and information exchange between systems—Intermediate pystem to Intermediate System intra-domain routeing information exchange protocol for use in conjunction with the protocol for providing the connectionless-mode network service (ISO 8473), International Standard, ISO/IEC 10589:1992, Technical Corrigendum 3, published Dec. 5, 1996, 4 pages.

IEEE Standard for Local and metropolitan area networks—Bridges and Bridged Networks, IEEE Std. 802.1Q, 2014 (Revision of IEEE Std_ 802.1 Q-2011), 1832 pages.

* cited by examiner

300

311

400

Application

Local
Portal
(Applicant)

Neighbor
Portal
(Registrar)

401
Hello LRPDU

403
Hello LRPDU

405
Record Change

407
Record LRPDU

409
Partial List LRPDU

411
All Record Ack

412
Failure

413
Complete List LRPDU

415
Connection Interruption

416
Disconnected

Maintain Database

417

418
Complete List LRPDU

419
Request Complete List LRPDU

Complete List LRPDU

421

500

Hello LRPDU

| Type 501 |  |
|---|---|
| Length 503 |  |
| AppId 505 |  |
| Hello Status 507 | Error Status 508 |
| My Portal Number 509 |  |
| Hello Time 511 |  |
| My Chassis ID 513 |  |
| My Port ID 515 |  |
| Neighbor Chassis ID 517 |  |
| Neighbor Port ID 519 |  |
| Application Information 521 |  |

FIG. 5

600
Record LRPDU
| Type 601 |
| Length 603 |
| My Portal Number 609 |
| Record(s) 630 |
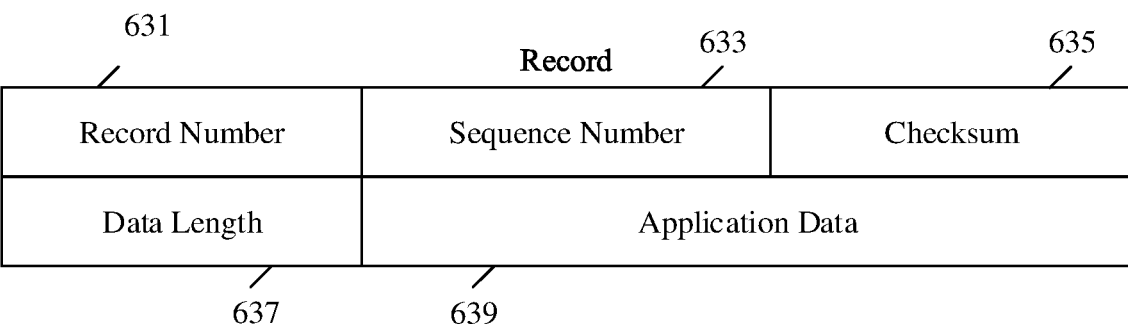
631          Record          633          635
| Record Number | Sequence Number | Checksum |
| Data Length | Application Data |
637          639
FIG. 6

700
Partial List LRPDU
| |
|---|
| Type 701 |
| Length 703 |
| My Portal Number  709 |
| Record Header(s) 730 |
731                     Record Header     733                     735
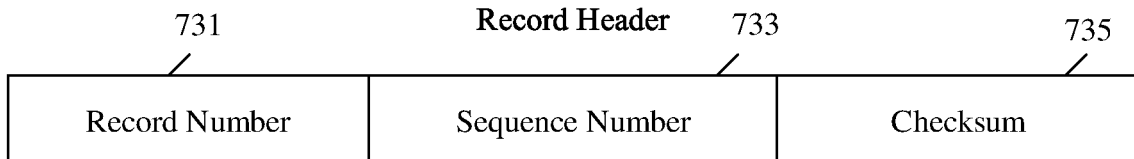
| Record Number | Sequence Number | Checksum |
|---|---|---|
FIG. 7

800
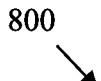
Complete List LRPDU
| |
|---|
| Type 8<u>01</u> |
| Length <u>803</u> |
| My Portal Number <u>809</u> |
| First Record Number <u>823</u> |
| Last Record Number <u>825</u> |
| Record Headers <u>830</u> |
831              Record Header    833            835
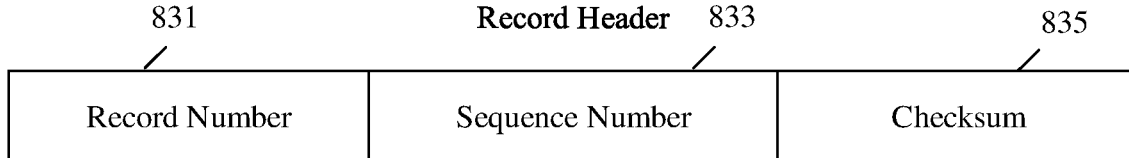
| Record Number | Sequence Number | Checksum |
|---|---|---|
FIG. 8

900

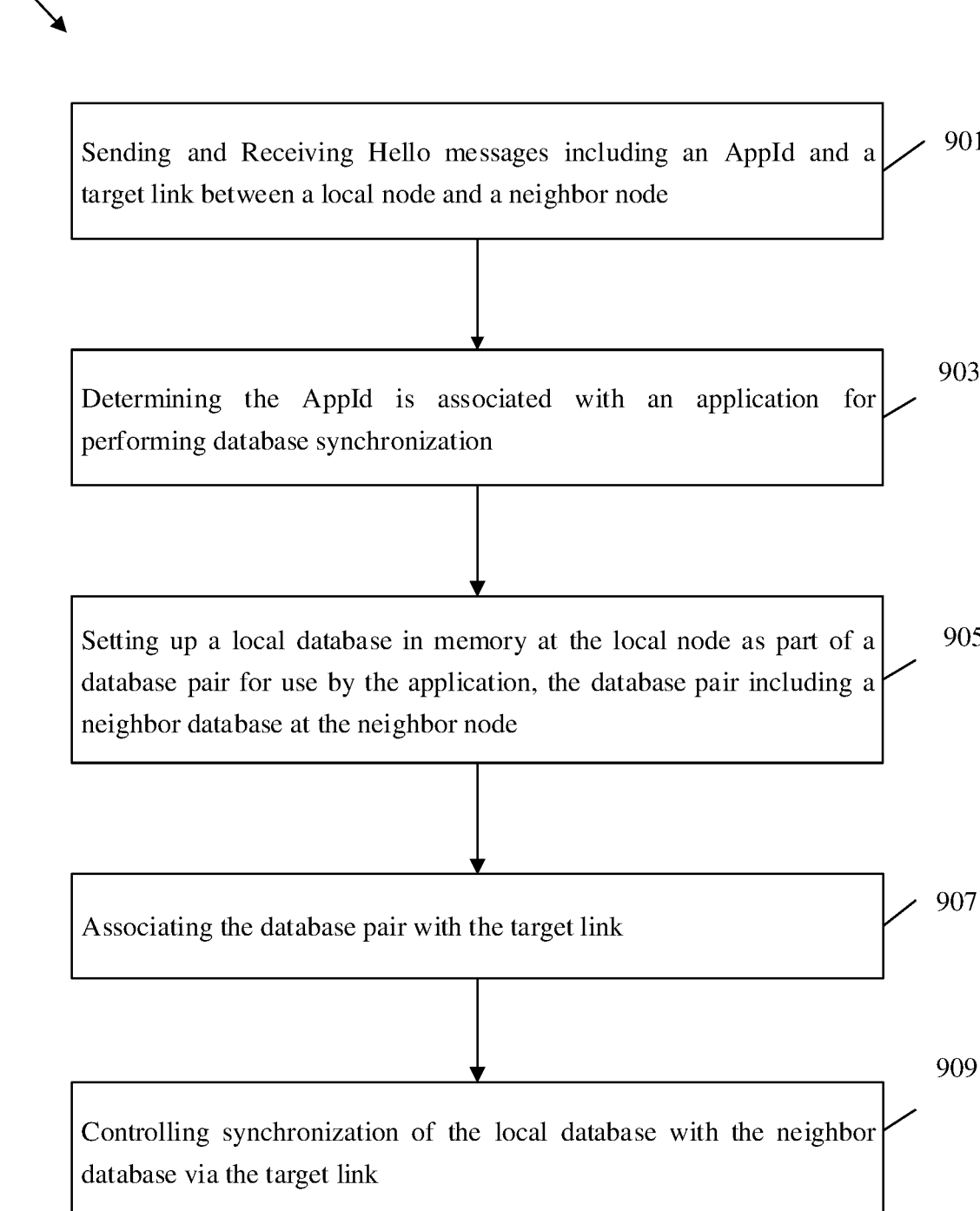

Sending and Receiving Hello messages including an AppId and a target link between a local node and a neighbor node　　901

Determining the AppId is associated with an application for performing database synchronization　　903

Setting up a local database in memory at the local node as part of a database pair for use by the application, the database pair including a neighbor database at the neighbor node　　905

Associating the database pair with the target link　　907

Controlling synchronization of the local database with the neighbor database via the target link　　909

FIG. 9

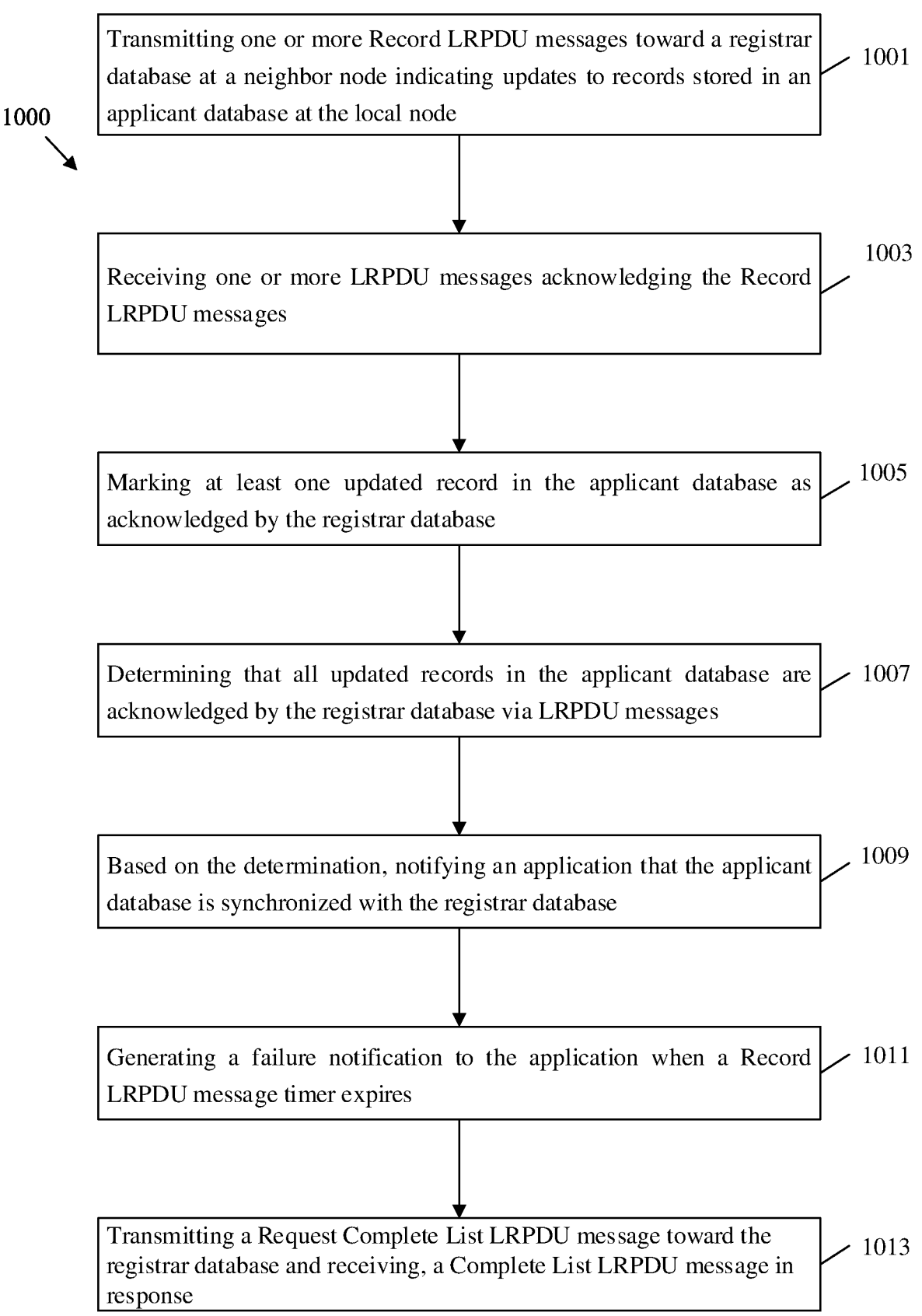

1000

Transmitting one or more Record LRPDU messages toward a registrar database at a neighbor node indicating updates to records stored in an applicant database at the local node — 1001

Receiving one or more LRPDU messages acknowledging the Record LRPDU messages — 1003

Marking at least one updated record in the applicant database as acknowledged by the registrar database — 1005

Determining that all updated records in the applicant database are acknowledged by the registrar database via LRPDU messages — 1007

Based on the determination, notifying an application that the applicant database is synchronized with the registrar database — 1009

Generating a failure notification to the application when a Record LRPDU message timer expires — 1011

Transmitting a Request Complete List LRPDU message toward the registrar database and receiving, a Complete List LRPDU message in response — 1013

FIG. 10

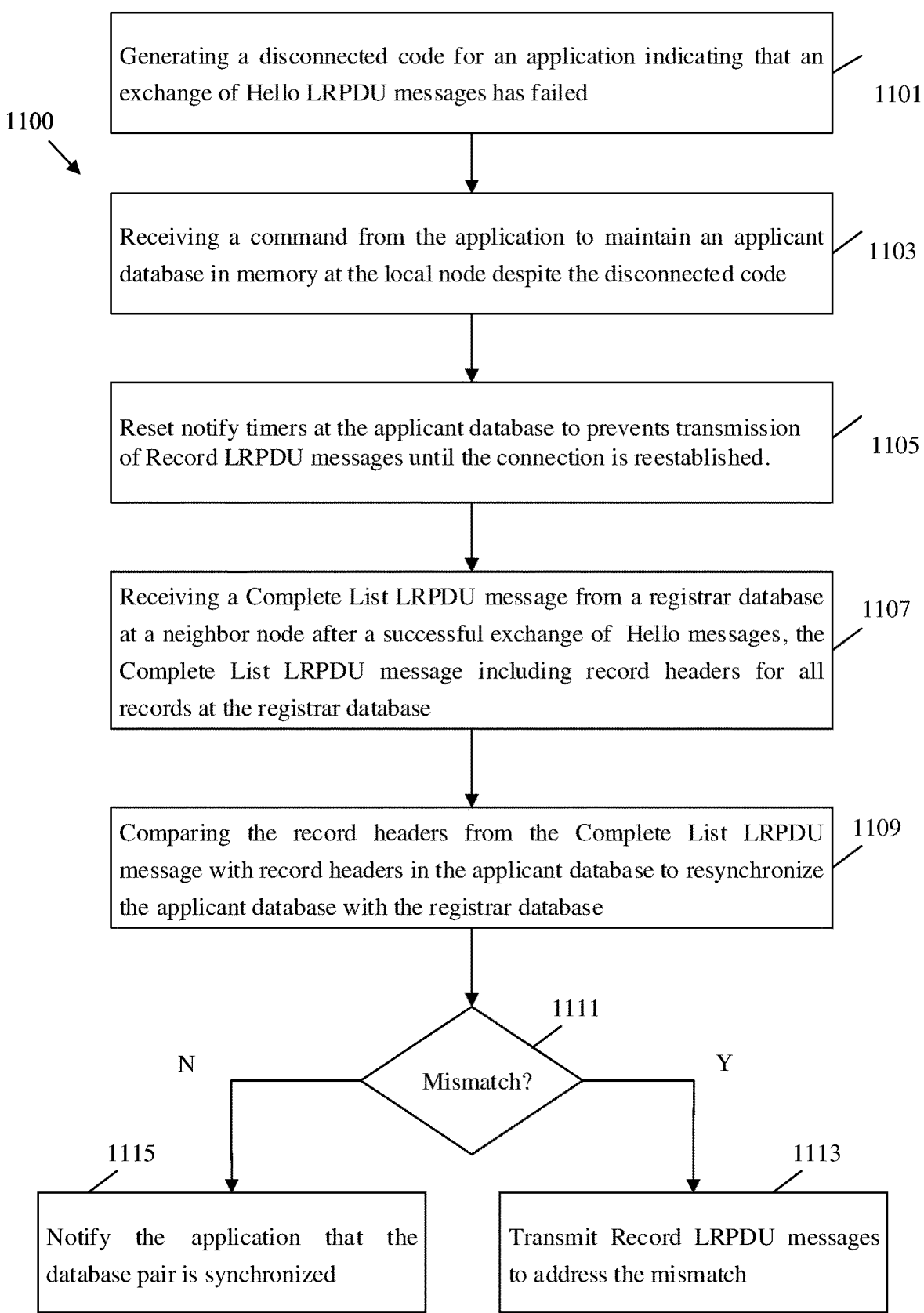

1100

Generating a disconnected code for an application indicating that an exchange of Hello LRPDU messages has failed — 1101

Receiving a command from the application to maintain an applicant database in memory at the local node despite the disconnected code — 1103

Reset notify timers at the applicant database to prevents transmission of Record LRPDU messages until the connection is reestablished. — 1105

Receiving a Complete List LRPDU message from a registrar database at a neighbor node after a successful exchange of Hello messages, the Complete List LRPDU message including record headers for all records at the registrar database — 1107

Comparing the record headers from the Complete List LRPDU message with record headers in the applicant database to resynchronize the applicant database with the registrar database — 1109

1111

N    Mismatch?    Y 1115    1113

Notify the application that the database pair is synchronized

Transmit Record LRPDU messages to address the mismatch

FIG. 11

1200
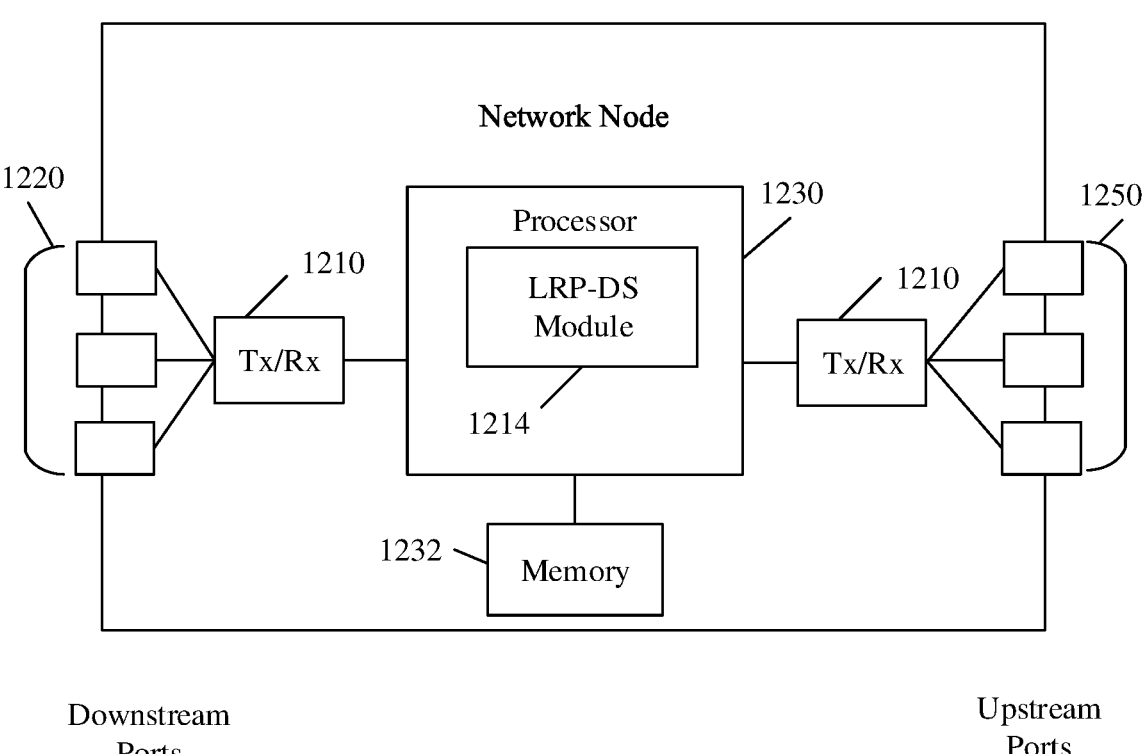
FIG. 12

1300

1301 Receiving

1303 Determination

1305 Database Pair Setup

1307 Association

1309 Synchronization Control

1400

1401 Transmitting

1403 Receiving

1405 Memory

1407 Determination

1409 Notification

POINT-TO-POINT DATABASE SYNCHRONIZATION OVER A TRANSPORT PROTOCOL

CROSS-REFERENCE TO RELATED APPLICATIONS

This disclosure is a divisional Patent Application of U.S. patent application Ser. No. 17/066,003, which is a continuation application of International Patent Application No. PCT/CN2019/081640, filed on Apr. 9, 2019, which claims the benefit of U.S. Provisional Patent Application No. 62/655,625, filed Apr. 10, 2018 by Dean Cheng, et al., and titled "Point-to-Point Database Synchronization Over a Transport Protocol," and U.S. Provisional Patent Application No. 62/782,993, filed Dec. 20, 2018 by Dean Cheng, et al., and titled "Point-to-Point Database Synchronization Over a Transport Protocol," which are hereby incorporated by reference.

TECHNICAL FIELD

The present disclosure is generally related to database management, and is specifically related to communication protocols for managing point-to-point database synchronization.

BACKGROUND

Database synchronization is the process of establishing consistency between multiple database systems. The goal of database synchronization is to ensure that changes to a first database are propagated to one or more corresponding database systems. Database synchronization may involve creating complicated application specific implementations that may not be interoperable with other implementations. Such applications may be required to implement mechanisms for managing communication resources to ensure consistency and verify that information is actually received by other database systems. Further, maintaining database synchronization may become problematic in the event of a loss of connectivity. For example, retransmitting all database files upon reestablishing connectivity may be an inefficient use of communication resources in some cases.

SUMMARY

In an embodiment, the disclosure includes a method implemented in a local node, the method comprising: receiving, at a receiver at the local node, a Hello message including an application identifier (AppId) and a target link between a target port for a local node and target port for a neighbor node; determining, by a processor at the local node, the AppId is associated with an application for performing database synchronization; setting up a local database in memory at the local node as part of a database pair for use by the application, the database pair including a neighbor database at the neighbor node; associating, by the processor, the database pair with the target link; and controlling synchronization of the local database with the neighbor database via the target link. This approach allows a communication protocol to automatically setup one or more database pairs for synchronization over a network. The protocol obtains a target link and the AppId from the Hello messages. The protocol can then correlate the application with the target link and setup databases for synchronization on behalf of the application. In this manner, database setup can be offloaded from the application, which allows the database synchronization to be setup and maintained without direct management by the application. This in turn allows the application to enact database synchronization without being directly aware of the underlying network messaging to accomplish such synchronization.

Optionally, in any of the preceding aspects, another implementation of the aspect includes, wherein controlling synchronization of the local database with the neighbor database includes transmitting, by a transmitter at the local node, record information to the neighbor database via the target link in Link-Local Registration Protocol Data Unit (LRPDU) messages. Database information is stored in records. Record version information (e.g., control information) is exchanged via LRPDUs sent over the target link. Hence, LRPDU messages can act as a mechanism for indicating to a neighbor node that database records have been updated, and vice versa. As such, LRPDU messages can be employed to manage database synchronization.

Optionally, in any of the preceding aspects, another implementation of the aspect includes, wherein the local database includes an applicant database to store local records for transmission to a registrar database in the neighbor database.

Optionally, in any of the preceding aspects, another implementation of the aspect includes, wherein the local database includes a registrar database to receive neighbor records from an applicant database in the neighbor database. Database pairs include an applicant, which contains records to be uploaded, and a registrar which receives copies of the applicant records. A local node and a neighbor node can each include both an applicant database and a registrar database for bidirectional synchronization. Further, an applicant database can be positioned at a local node and a registrar database can be positioned at a neighbor node, or vice versa, for one way synchronization.

Optionally, in any of the preceding aspects, another implementation of the aspect includes, wherein the Hello message is a Hello LRPDU, and wherein the Hello LRPDU represents the target link as a My Chassis identifier (ID) identifying the local node, a My Port ID identifying a target port on the local node, a Neighbor Chassis ID identifying the neighbor node, and a Neighbor Port ID identifying a target port on the neighbor node. The target link can be specified by chassis ID and port ID, which represents a target port at each end of the target link. This approach allows for unique identification of the target link, and hence an indication to each of the local node and the neighbor node, where the corresponding node can be located for LRPDU communication purposes.

In an embodiment, the disclosure includes a method implemented in a local node, the method comprising: transmitting, by a transmitter at the local node, one or more Record LRPDU messages toward a registrar database at a neighbor node, the Record LRPDU messages indicating updates to records stored in an applicant database at the local node; receiving, by a receiver at the local node, one or more LRPDU messages acknowledging the Record LRPDU messages; marking, in a memory at the local node, at least one updated record in the applicant database as acknowledged by the registrar database; and notifying, via the processor, an application that the applicant database is synchronized with the registrar database. This mechanism allows a network communication protocol to monitor database communications and determine when the databases are synchronized. The network protocol can then alert the application that synchronization is complete. In this manner, the application need not be aware of each record exchange and associated communications. The application can make changes to the local applicant database and allow the network protocol to manage synchronization and alert the application when synchronization has been completed.

Optionally, in any of the preceding aspects, another implementation of the aspect includes, further comprising determining, by a processor at the local node, that all updated records in the applicant database are acknowledged by the registrar database via LRPDU messages, wherein the notifying the application that the applicant database is synchronized with the registrar database is initiated based on the determination that all updated records in the applicant database are acknowledged by the registrar database via LRPDU messages. The applicant can determine when each record is acknowledged and notify the application when all records are acknowledged, and hence synchronization between the applicant database and registrar database is complete.

Optionally, in any of the preceding aspects, another implementation of the aspect includes, wherein the LRPDU messages acknowledging the Record LRPDU messages include a Partial List LRPDU message, the Partial List LRPDU message including at least one record header acknowledging the at least one updated record. The Partial List LRPDU message acts as an acknowledgement message. The Partial List LRPDU message is sent from the registrar and indicates to the applicant that the registrar has made the update requested by the Record LRPDU message.

Optionally, in any of the preceding aspects, another implementation of the aspect includes, wherein the record header includes a record number indicating the updated record and a sequence number identifying an update included in the updated record. Such information can indicate the particular record update(s) that have been received by the registrar.

Optionally, in any of the preceding aspects, another implementation of the aspect includes, further comprising generating a failure notification to the application when a Record LRPDU message timer expires without receiving a corresponding Partial List LRPDU message. This mechanism allows the application to be notified of potential record communication failures. The Record LRPDU message may not be resent automatically, as large volumes of communications may overrun the receive buffers at the registrar (e.g., potentially causing more record synchronization failures).

Optionally, in any of the preceding aspects, another implementation of the aspect includes, wherein the LRPDU messages acknowledging the Record LRPDU messages include a Complete List LRPDU message, the Complete List LRPDU message including record headers for all records at the registrar database. The Complete List LRPDU message can be sent by the registrar at a predetermined interval. The Complete List LRPDU message includes the current state of the registrar database. Hence, the applicant can employ the Complete List LRPDU message to determine when records were received by the registrar and the acknowledgement message was dropped versus when record updates were not received by the registrar. The applicant can then recover from synchronization errors by sending additional Record LRPDU messages based on the content of the Complete List LRPDU message.

Optionally, in any of the preceding aspects, another implementation of the aspect includes, wherein the Complete List LRPDU message includes a first record number field indicating the first record stored at the registrar database and a last record number field indicating the last record stored at the registrar database, and wherein the record headers include record numbers indicating the records stored at the registrar database and sequence numbers identifying updates included in the records stored at the registrar database.

Optionally, in any of the preceding aspects, another implementation of the aspect includes, wherein the Record LRPDU messages include one or more record numbers indicating records updated at the applicant database and one or more sequence numbers identifying updates included in the records updated at the applicant database.

Optionally, in any of the preceding aspects, another implementation of the aspect includes, further comprising: transmitting, by the transmitter, a Request Complete List LRPDU message toward the registrar database; and receiving, by the receiver, a Complete List LRPDU message from the registrar database in response to the Request Complete List LRPDU message. By employing this mechanism, the applicant can request a Complete List LRPDU message on demand rather than waiting for a periodic Complete List LRPDU message.

In an embodiment, the disclosure includes a method implemented in a local node, the method comprising: generating, by a processor at the local node, a disconnected code for an application, the disconnected code indicating that an exchange of Hello Link-Local Registration Protocol Data Unit (LRPDU) messages has failed; receiving, at the processor, a command from the application to maintain an applicant database in memory at the local node despite the disconnected code; receiving, by a receiver at the local node, a Complete List LRPDU message from a registrar database at a neighbor node after a successful exchange of Hello LRPDU messages, the Complete List LRPDU message including record headers for all records at the registrar database; and comparing, by the processor, the record headers from the Complete List LRPDU message with record headers in the applicant database to resynchronize the applicant database with the registrar database. This mechanism allows for maintaining a database pair despite a connection loss. When a connection loss occurs, the applicant is notified and allowed to choose whether to reset the synchronization upon connection reestablishment (e.g., by resending all the records) or to recover synchronization upon connection reestablishment. The database pair can be maintained by sending a Complete List message from the registrar upon reconnecting via Hello exchange. The applicant database can then compare the record headers from the registrar database with the applicant database record headers to determine which, if any, updates were lost due to the connection loss. The applicant database can then resend only the lost updates instead of resending the entire list of applicant database records to the registrar. Such an approach may decrease network resource usage and synchronization recovery time when a network connection between the applicant and the registrar occurs.

Optionally, in any of the preceding aspects, another implementation of the aspect includes, further comprising resetting notify timers at the applicant database after an unsuccessful exchange of Hello messages to prevent transmission of Record LRPDU messages until the Complete List LRPDU message is received. This causes the applicant database to stop trying to synchronize databases until the connection is restored, and hence saves network and processing resources.

Optionally, in any of the preceding aspects, another implementation of the aspect includes, further comprising: determining, by the processor, a mismatch between one or more record headers in the applicant database and one or more record headers from the Complete List LRPDU message; and transmitting a Record LRPDU message toward the registrar database, the Record LRPDU message containing updated record headers addressing the mismatch. In the event of a mismatch updated records can be sent from the applicant to the registrar. This can occur because a previous Record LRPDU message was lost in the connection loss.

Optionally, in any of the preceding aspects, another implementation of the aspect includes, further comprising: determining, by the processor, no mismatch between record headers in the applicant database and record headers from the registrar database; and based on the determination of no mismatch, notifying, via the processor, the application that the applicant database is synchronized with the registrar database. This allows the network protocol to manage the synchronization on behalf of the application, and hence allows the application to be unaware of the communication specifics related to database synchronization.

In an embodiment, the disclosure includes a local node comprising a memory, a transmitter, a receiver, and a processor coupled to the memory, the transmitter, the receiver, the local node configured to perform the method of the preceding aspects.

In an embodiment, the disclosure includes a non-transitory computer readable medium comprising a computer program product for use by a local node, the computer program product comprising computer executable instructions stored on the non-transitory computer readable medium such that when executed by a processor cause the local node to perform the method of the preceding aspects.

In an embodiment, the disclosure includes local node comprising: a receiving module for receiving a Hello message including an application identifier (AppId) and a target link between a local node and a neighbor node; a determination module for determining the AppId is associated with an application for performing database synchronization; a database pair setup module for setting up a local database at the local node as part of a database pair for use by the application, the database pair including a neighbor database at the neighbor node; an association module for associating the database pair with the target link; and a synchronization control module for controlling synchronization of the local database with the neighbor database via the target link.

In an embodiment, the disclosure includes a local node comprising: a transmitting module for transmitting one or more Record Link-Local Registration Protocol Data Unit (LRPDU) messages toward a registrar database at a neighbor node, the Record LRPDU messages indicating updates to records stored in an applicant database at the local node; a receiving module for receiving one or more LRPDU messages acknowledging the Record LRPDU messages; a memory module for marking at least one updated record in the applicant database as acknowledged by the registrar database; a determination module for determining that all updated records in the applicant database are acknowledged by the registrar database via LRPDU messages; and a notification module for notifying an application that the applicant database is synchronized with the registrar database based on the determination that all updated records in the applicant database are acknowledged by the registrar database via LRPDU messages.

In an embodiment, the disclosure includes a local node comprising: a disconnection module for generating a disconnected code for an application, the disconnected code indicating that an exchange of Hello Link-Local Registration Protocol Data Unit (LRPDU) messages has failed; a command module for receiving a command from the application to maintain an applicant database in memory at the local node despite the disconnected code; a receiving module for receiving a Complete List LRPDU message from a registrar database at a neighbor node after a successful exchange of Hello messages, the Complete List LRPDU message including record headers for all records at the registrar database; and a record comparison module for comparing the record headers from the Complete List LRPDU message with record headers in the applicant database to resynchronize the applicant database with the registrar database.

Optionally, in any of the preceding local nodes, another implementation of the local node includes, further comprising modules for performing the method of any of the preceding aspects.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 5 illustrates an example encoding of a Hello Link-Local Registration Protocol Data Unit (LRPDU) message.

FIG. 6 illustrates an example encoding of a Record LRPDU message.

FIG. 7 illustrates an example encoding of a Partial List LRPDU message.

FIG. 8 illustrates an example encoding of a Complete List LRPDU message.

FIG. 9 is a flowchart of an example method of establishing a database pair.

FIG. 10 is a flowchart of an example method of managing database pair synchronization.

FIG. 11 is a flowchart of an example method of maintaining database synchronization despite connection interruption.

FIG. 12 is a schematic diagram of an example network element for managing database synchronization.

DETAILED DESCRIPTION

Figure 1:
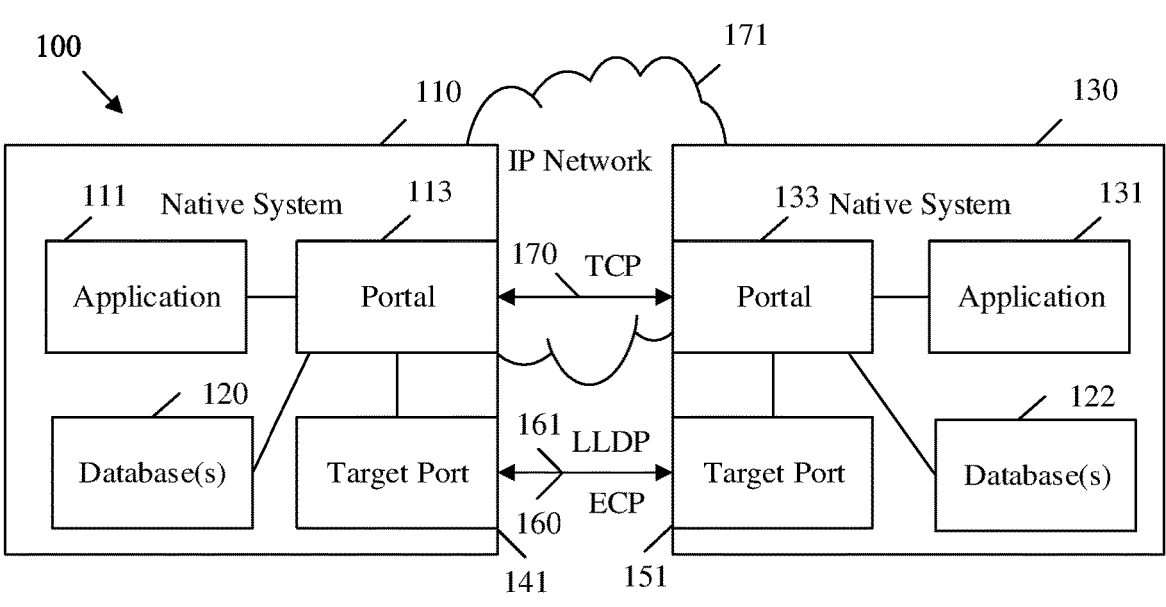
FIG. 1 is a schematic diagram of an example native system implementation of a database synchronization network.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Standardized communication protocols may be employed to support database synchronization. Such communication protocols can be configured to maintain database consistency in a standardized way. For example, Link-local Registration Protocol (LRP) is a standard that specifies protocols, procedures, and managed objects to replicate a registration database from one end to the other end of a point-to-point link and to replicate changes to parts of that database. LRP may be optimized for databases on the order of one megabyte. LRP Database Synchronization (LRP-DS) can be employed to setup communications between databases. LRP-DS employs Hello messages, in a manner similar to the Intermediate System to Intermediate System (IS-IS) protocol, to establish node adjacencies. LRP Database Transport (LRP-DT) can then be employed to transport data, carried in Record messages provided by LRP-DS, in a manner similar to Link State Advertisement (LSA) messages carried by IS-IS. LRP-DS thus manages database synchronization on behalf of related applications.

Disclosed herein are mechanisms to improve the functionality of LRP-DS. For example, LRP-DS can be improved to automatically setup database pairs for synchronization. The database pair includes an applicant database at a first node and a registrar database at a second node. Such nodes may also be referred to as a local node and a neighbor node, respectively, for clarity of discussion. When updates are made to the applicant database, the LRP-DS protocol communicates such updates to the registrar database to maintain synchronization. For one-way communication, the local node contains an applicant database and the neighbor node contains a registrar database. For bidirectional communication, the local node contains an applicant database for synchronization with a registrar database at the neighbor node and the neighbor node contains an applicant database for synchronization with a registrar database at the local node. In either case, the database pair(s) can be setup automatically upon exchange of Hello Link-Local Registration Protocol Data Unit (LRPDU) messages. The Hello LRPDU messages contain an application identifier (AppId) of the corresponding application and a target link denoted in terms of a My Chassis identifier (ID) identifying the local node, a My Port ID identifying a target port on the local node, a Neighbor Chassis ID identifying the neighbor node, and a Neighbor Port ID identifying a target port on the neighbor node. Upon exchange of Hello messages, the local node and the neighbor node can automatically create applicant and registrar database pairs for the identified application and correlate such database pairs based on the target link.

LRP-DS, which operates in a component referred to as a portal, can also be employed to automatically inform the application when the databases are synchronized after one or more updates. For example, when an update is made at an applicant database, a Record LRPDU message is sent to the registrar database to indicate the database record(s) that have been updated and the sequence number(s) (e.g., version numbers) of such updated records. The registrar database responds with a Partial List LRPDU message that acknowledges awareness of the updated records, which can be communicated via LRP-DT. When the Partial List LRPDU message is received, the portal causes the indicated records in the applicant database to be marked as acknowledged. Multiple Record LRPDUs and Partial List LRPDUs can be exchanged. When all records in the applicant database have been marked as acknowledged, the portal can send an indication to the application that the databases are synchronized.

In another example, LRP-DS can be employed to maintain synchronization between databases despite a connection interruption. Hello LRPDU messages may be exchanged periodically. When a Hello LRPDU message exchange fails, the portal can notify the application. The applicant can choose to delete the pairing and create a new database pair upon reconnection by re-uploading the database records to the new registrar database. The applicant can also choose to maintain the current database pair. When the portal receives an indication that the database pairing is to be maintained, the portal discontinues further Record LRPDU messages. Upon reestablishing a Hello LRPDU message exchange, the registrar sends a Complete List LRPDU message to the applicant. The Complete List LRPDU message contains record headers for all records at the registrar database. The applicant database can compare the record headers in the Complete List LRPDU message with the record headers stored in the applicant database to determine any record mismatches. This may happen when Record LRPDU messages are lost due to the connection loss. The applicant database can then send Record LRPDU messages containing any record updates made since the record state contained in the Complete List LRPDU message. Typically, the result is the transmission of fewer Record LRPDUs than would be the case without the quick Complete List LRPDU transmission. The portal can also notify the application once the databases are synchronized. These and other example embodiments are discussed in greater detail with respect to the following FIGS.

FIG. 1 is a schematic diagram of an example native system implementation of a database synchronization network 100. The database synchronization network 100 includes a native system 110 and a native system 130 coupled by an Internet Protocol (IP) network 171. The native system 110 and native system 130 include one or more databases 120 and 122, respectively, for synchronization. For clarity of discussion, a native system 110 or 130 is referred to herein as local when discussed with respect to source operations occurring on a first system and as a neighbor when discussed with respect to destination operations occurring on an a second system. Hence, native systems 110 and 130 can be local, neighbor, or both, depending on the context. It should also be noted that the terms local and neighbor, as used herein, are relative, are employed to clearly distinguish between a first node and a second node, and may be used interchangeably when discussing the same network from a different perspective.

Native system 110 is a computing component that includes an application 111, a portal 113, a target port 141, and databases 120. An application 111 is a computer program operable to distribute information between at least native system 110 and/or proxy system and a native system 130 and/or a proxy system. Proxy systems are discussed with respect to FIG. 2 below. For example, the application 111 may include a user operable program with a save file that is synchronized with a cloud storage system. The application 111 uploads data to an application 131 and/or downloads data from an application 131. For purposes of simplicity, only two applications 111 and 131 are shown, but application 111 can synchronize with any number of other applications.

A portal 113 is an instantiation of a portal interface, along with instances of applicant and/or registrar state machines and databases 120 associated with a single application 111. For example, the portal 113 operates LRP (e.g., LRP-DS and LRP-DT) on behalf of the application 111. The portal 113 receives notifications from the application 111 and/or databases 120, performs corresponding LRP operations, and provides responsive notifications to the application 111 and/or databases 120. For example, the portal 113 operates LRP-DS by managing communication of LRPDU messages. The portal 113 operates LRP-DT by communicating data, such as database 120 records, with a corresponding portal 133, for example via a Transmission Control Protocol (TCP) connection 170. In some examples, an application 111 on a native system 110 maintains a separate portal 113 and corresponding databases 120 on each of many target ports 141 in the native system 110.

Native system 110 can also operate a Link Layer Discovery Protocol (LLDP) 161 over the target port 141. Alternatively, the native system 110 maintains a repository of information, controlled by a system administrator, containing equivalent data to that generated by LLDP 161.

Databases 120 include one or more file storage repositories for an application 111. The files in databases 120 are stored as records. A record is a subset of a database 120 that is transferred as a single unit from an applicant to a registrar by the LRP operating in the portal 113. Each record includes data, a record number identifying the data, and a sequence number. The sequence number identifies the current version of the record. For example, the sequence number may be implemented as a counter that indicates the number of times a record has been updated. The databases 120 may include an applicant database, a registrar database, or both. An applicant is one of the two roles (with registrar) an application 111 can have with respect to a portal 113. The applicant controls a database 120 that the LRP replicates to a registrar in a neighbor portal 133. A registrar is one of the two roles (with applicant) an application 111 can have with respect to a portal 113. The registrar receives the copy of the database 122 that the LRP replicates from the applicant in the neighbor portal 133. As such, the databases 120 can include an applicant database for uploading records to database 122, a registrar database for downloading records from database 122, or both for bidirectional communication of records with databases 122.

A target port 141 is a communications port on a native system 110. A portal 113 and associated applicant and registrar databases 120 are associated with a single target port 141. A target port 141 can be associated with more than one portal 113 if such portals 113 serve different applications 111. A target port 141 provides access to a link that connects to one or more other target ports 151 (e.g., in other systems).

Native system 130 is substantially similar to native system 110. Native system 130 contains a portal 133, an application 131, a database 122, and a target port 151, which may be substantially similar to the portal 113, an application 111, a database 120, and a target port 141, respectively.

The native systems 110 and 130 discover each other to setup database 120 and 122 pairs via LLDP 161. LLDP 161 is a link layer protocol, described by Institute of Electrical and Electronics Engineers (IEEE) standard document 802.1AB, used by network devices for advertising their identity, capabilities, and neighbors over a network. In particular, the native systems 110 and 130 can advertise their application 111 and 131, LRP-DS, and LRPDT capabilities to each other, via target ports 141 and 151 by employing LLDP 161. Addresses for use by LRP-DT when carrying LRPDU messages can be determined through LLDP 161, along with a preference for using either the Edge Control Protocol (ECP) 160 or the Transmission Control Protocol (TCP) to carry those LRPDU messages. ECP 160 is a network protocol defined by IEEE Standard 802.1Q-2014. TCP 170 is defined by the Internet Engineering Task Force (IETF) document Request For Comment (RFC) 793. Either can be used to carry LRPDU messages. If ECP 160 is used, the ECP packets pass through the target ports 141 and 151. If TCP 170 is used, LRPDU packets can pass through the target ports 141, 151, or through any other ports on the two native systems 110 and 130.

The LRPDU messages act as control messages that indicate record updates at databases 120 and/or 122, acknowledgements, and other management information related to database synchronization. The LRPDU messages discussed herein include Hello LRPDU messages, Record LRPDU messages, Partial List LRPDU messages, Complete List LRPDU messages, and Request Complete List LRPDU messages. However, other LRPDU messages can be employed as desired to enforce database 120 and 122 synchronization. Using the LRPDU messages, the portals 113 and 133 can exchange database 120 and 122 records to synchronize the databases 120 and 122. For example, the database 120 and 122 record LRPDUs can be exchanged via a TCP connection 170. The TCP connection 170 is a point to point communication session employed for exchanging data. The TCP connection 170 can be routed between the target ports 141 and 151 or between other ports, depending on the example. The TCP connection 170 can traverse one or more IP networks 171, which are Open Systems Interconnection (OSI) model layer three networks supporting point-to-point communications. As discussed with respect to the FIGS. below, the foregoing components can be employed by the portals 113 and/or 133 to manage database 120 and 122 synchronization on behalf of applications 111 and/or 131, in part via target ports 141 and 151.

Figure 2:
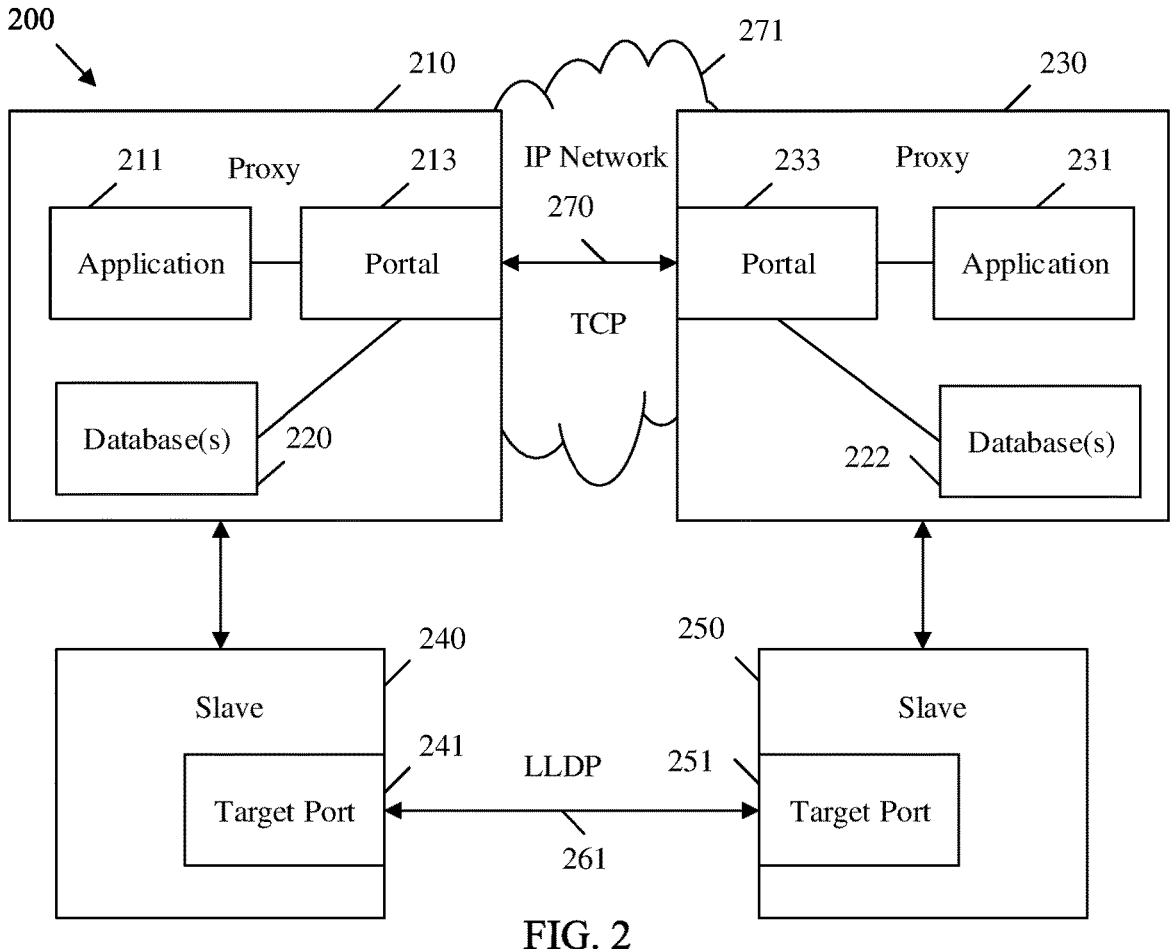
FIG. 2 is a schematic diagram of an example proxy system implementation of a database synchronization network.

FIG. 2 is a schematic diagram of an example proxy system implementation of a database synchronization network 200. The database synchronization network 200 includes a proxy 210, a proxy 230, a slave 240, and a slave 250. The database synchronization network 200 is similar to database synchronization network 100, but target ports 241 and 251 have been moved from native systems to slaves 240 and 250, respectively. As used herein a proxy 210 and/or 230 is a computing component that contains at least an application 211, which is substantially similar to application 111. For example, a proxy 210 contains at least an application 211 operable to distribute information between the proxy 210 and a native system and/or a proxy system 230. The proxy 210 may also contain a portal 213 and/or databases 220, which are substantially similar to portal 113 and databases 120, respectively.

A slave 240 can be a communication component, such as a router, switch, etc., or can be and end station such as a camera, mechanical actuator, or personal computer. The slave 240 is coupled to the proxy 210 by a network connection. The slave contains at least one target port 241, which is substantially similar to target port 141. A communication component contains multiple target ports 241. Proxy 210 and slave 240 function together in a manner that is substantially similar to native system 110. By positioning the target port 241 at the slave 240 instead of the proxy 210, the application 211, portal 213 and/or databases 220 can be offloaded to a device (the proxy 210) that may be in a separate network than the slave 240. This provides for implementation flexibility while providing substantially the same functionality.

The proxy 230 is substantially similar to proxy 210 and contains a portal 233, application 231, and databases 222, which may be substantially similar to portal 213, application 211, and databases 220, respectively. The slave 250 is coupled to the proxy 230 and contains a target port 251, which may be substantially similar to target port 241. The slaves 240 and 250 employ LLDP 261 to exchange LLDP messages between target ports 241 and 251 in a manner similar to LLDP 161. The slaves 250 and 240 can forward such messages to portals 233 and 213 respectively. Record information from the LLDP messages can be employed to setup communication of database 220 and/or 222 records for synchronization across an IP network 271. The IP network 271 may be substantially similar to IP network 171. Such records can be communicated via a TCP connection 270, which is substantially similar to TCP connection 170.

It should be noted that various combinations of database synchronization networks 100 and 200 may also be employed within the scope of this disclosure. For example, a native system 110 can be employed to synchronize databases 120 with a proxy 230 and a slave 250. Further, a native system 130 can be employed to synchronize databases 122 with a proxy 210 and a slave 240. Various relay systems (e.g., routers and/or bridges) can be employed to route communications between the native systems, proxies, and/or slaves. Such components may include various capabilities as discussed below. On any communications device, the application 111, 131, 211, and/or 231 can exchange information among the applicant and registrar in databases 120, 122, 220, and 222 on different target ports 141, 151, 241, and 251 belonging to the same system.

Figure 3:
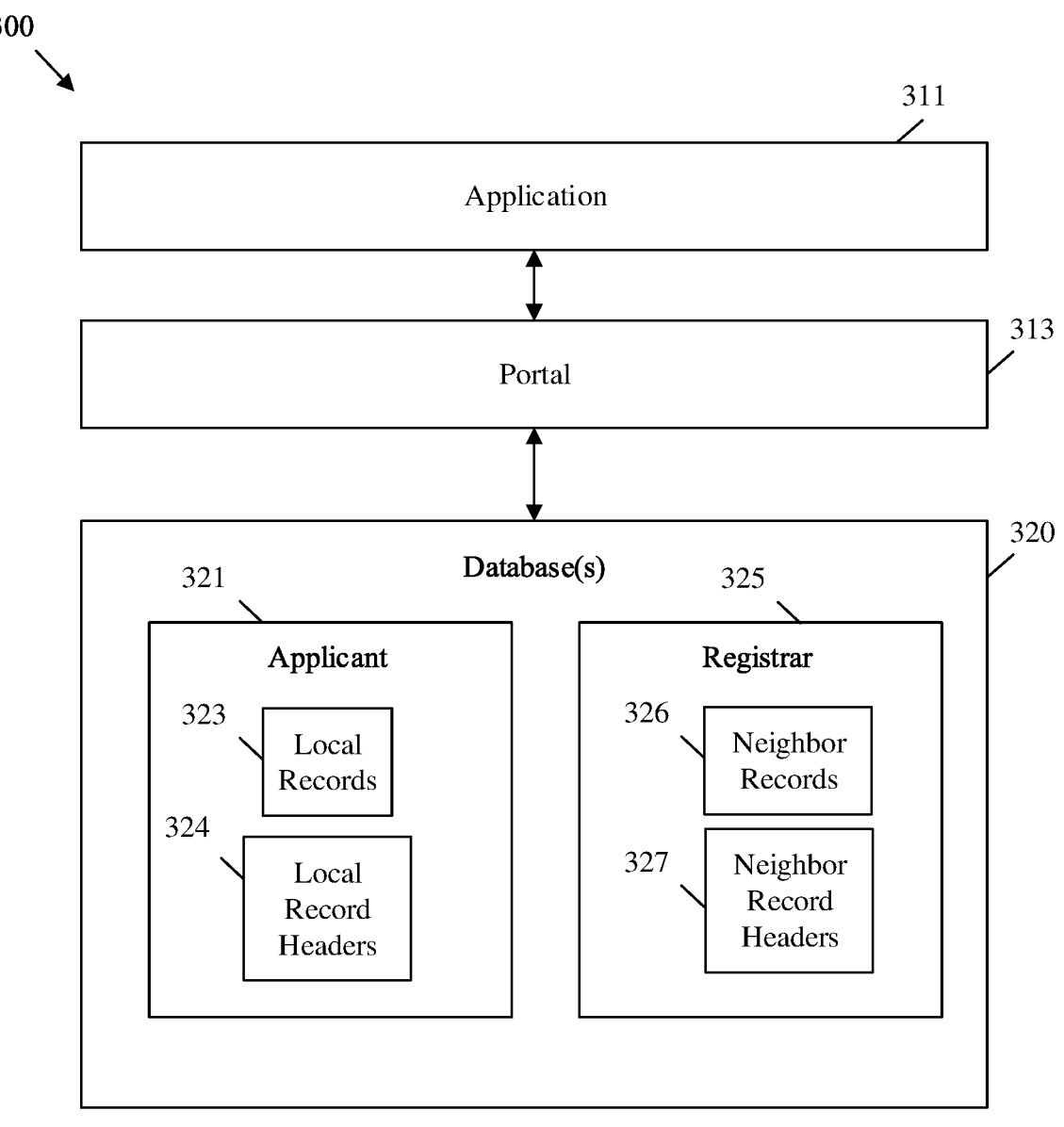
FIG. 3 is a schematic diagram of an example database system for database synchronization.

FIG. 3 is a schematic diagram of an example database system 300 for database synchronization. The database system 300 may be used to implement a native system 110, a native system 130, a proxy 210, and/or a proxy 230. The database system 300 includes an application 311, which is substantially similar to application 111, 131, 211, and/or 231. Specifically, the application 311 is a program that employs data for synchronization with a remote system, such as a neighbor database. The application instantiates a portal 313, which is substantially similar to portal 113, 133, 213, and/or 233. The portal 313 operates LRP (e.g., LRP-DS and LRP-DT) on behalf of the application 311. Hence, the portal 313, among other processes, manages communication of LRPDU messages and records for synchronization purposes. The portal 313 interacts with the application 311 and databases 320, which are substantially similar to databases 120, 122, 220, and/or 222. The databases 320 may include an applicant 321 and/or a registrar 325.

An applicant 321 is a state machine and corresponding memory space configured to upload copies of locally stored data to a registrar at a neighbor database. A registrar 325 is a state machine and corresponding memory space configured to receive copies of remotely stored data from an applicant at a neighbor database. Hence, a database 320 can contain an applicant 321 for uploading data for synchronization, a registrar 325 for downloading data for synchronization, or both for bi-directional synchronization. The applicant 321 and registrar 325 are each associated with the portal 313 to ensure that control messages and data reach their intended destinations. The portal 313 is further associated with a target port to ensure that messages are received at their intended portals (e.g., portal 313).

Data in the databases 320 are stored in records. A record is a smallest unit of data that can be communicated for synchronization. Record sizes can be configured by the application 311. Smaller records create complexity, but larger records result in the transfer of more data when a portion of a record is updated.

The applicant 321 contains local records 323 and local record headers 324. Local records 323 are records containing data used locally by the application 311. Record headers are a predefined group of status information related to corresponding records. For example, the local record headers 324 contain a record number, a sequence number, and/or a checksum for corresponding local records 323. A record number indicates the corresponding record. A sequence number includes version information. For example, a sequence number may include a counter indicating a number of times that the corresponding record has been modified. A checksum is error checking information and may include a digit representing the sum of a correct number of digits in a corresponding set of data for transmission. For example, the checksum may indicate the sum of the correct number of digits in the record number and sequence number. As such, when a local record 323 is updated, the corresponding local record header 324 can be signaled to indicate the record that has been updated and the version (e.g., sequence number) of the update.

The registrar 325 contains neighbor records 326 and neighbor record headers 327. The neighbor records 326 and neighbor record headers 327 are similar to the local records 323 and local record headers 324, respectively, but are related to data used by an application at a neighbor node/system.

Accordingly, a local database 320 can include an applicant 321 database to store local records 323 for transmission to a registrar database in a neighbor database. The local database 320 can also include a registrar 325 database to receive neighbor records 326 from an applicant database in the neighbor database. This transfer of records can be accomplished by employing LRPDU messages. For example, a Record LRPDU message can be transmitted from the portal 313 when local records 323 are modified. The Record LRPDU message contains the corresponding local record headers 324 to notify the registrar at the neighbor database of the local records 323 that have been updated and the current sequence of the update. The portal 313 can receive a responsive Partial Record List from the neighbor that acknowledges awareness of the updates to the local records. The portal 313 can also setup a data transfer with the portal at the neighbor node to transfer the updated local records 323. Likewise, an applicant at a neighbor can send a Record LRPDU message to the portal 313, via the neighbor portal, to indicate changes to neighbor records 326. The Record LRPDU message from the neighbor contains the updated neighbor record headers 327. The registrar 325 can then respond via the portal 313 with a Partial List LRPDU message containing the updated neighbor record headers 327 to indicate awareness of the updates at the neighbor database. The portal 313 can also manage a data transfer of the updated neighbor records 326 from the neighbor to the registrar 325. These and other messaging schemes for exchanging records and record headers between applicants 321 and registrars 325 for synchronization are discussed with respect to the FIGS below.

Figure 4:
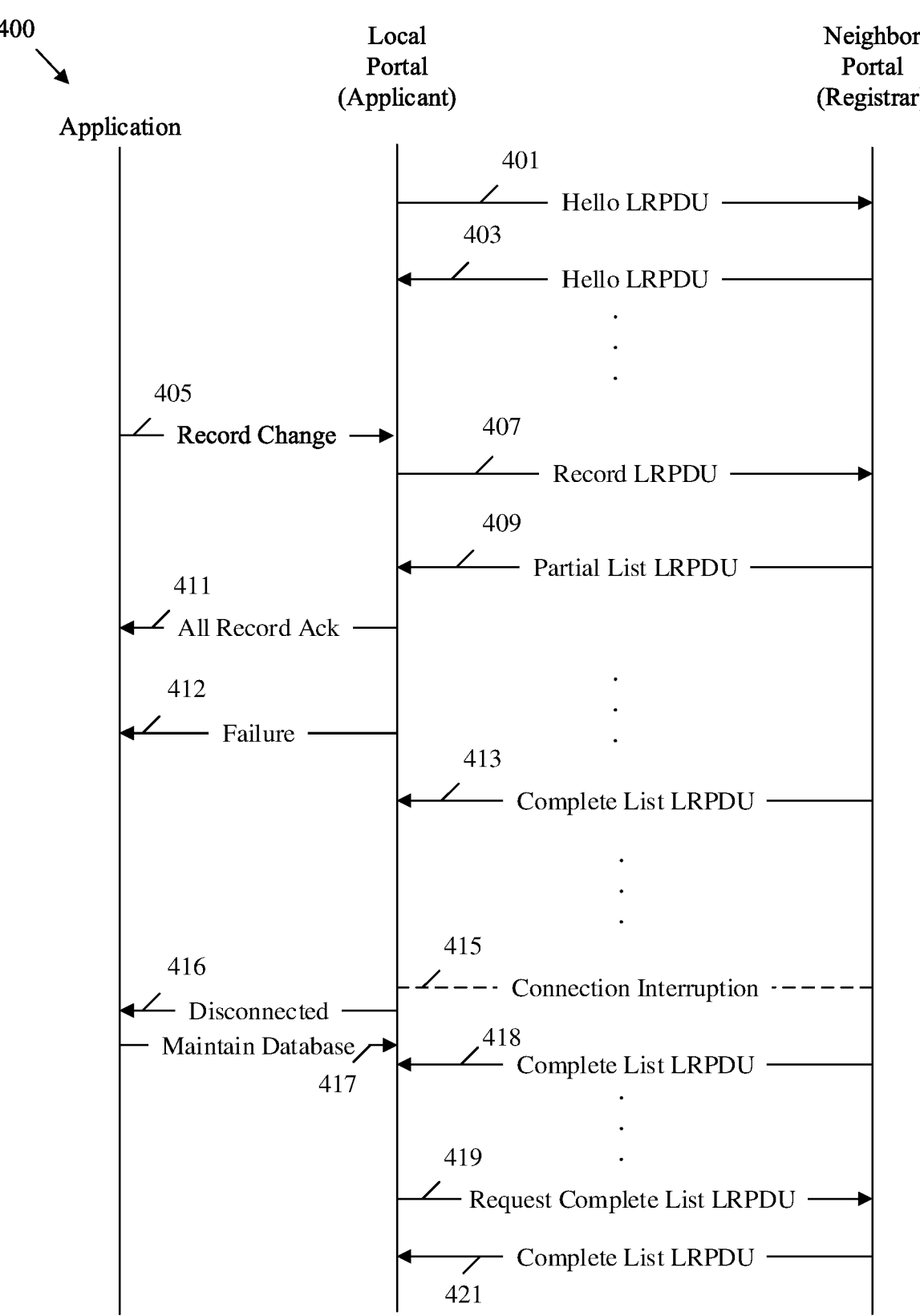
FIG. 4 is a protocol diagram of an example method of managing database synchronization.

FIG. 4 is a protocol diagram of an example method 400 of managing database synchronization. Method 400 may be implemented by a native system 110 and/or 130, a proxy 210 and/or 230 in conjunction with a slave 240 and/or 250, and/or a database system 300. Method 400 provides mechanisms to create and maintain a database pair including an applicant and a registrar. Management of a database pair includes maintaining synchronization between the applicant database and the registrar database. Method 400 is implemented by an application, a local portal controlling an applicant database at a local node, and a neighbor portal controlling a registrar database at a neighbor node.

In some examples, the local portal and the neighbor portal are preconfigured with ports and addresses of neighbor node(s) related to the application. In other examples, the local portal and the neighbor portal discover ports and addresses of neighbor node(s) related to the application via other discovery protocols. In either case, the local portal forwards a Hello LRPDU message 401 to the neighbor portal, and the neighbor portal forwards a Hello LRPDU message 403 to the local portal. This may also be referred to as an exchange of Hello LRPDU messages. The Hello LRPDU messages 401 and 403 include an application identifier (AppId) and identify a target link between a target port for a local node and target port for a neighbor node. The AppId indicates the application, and hence indicates that the sender is associated with an application that wishes to synchronize data. The target link in the Hello LRPDU messages 401 and 403 indicates that the attempt to communicate is successful and synchronization can begin.

Accordingly, when the local portal receives the Hello LRPDU messages 403, the local portal determines that the AppId is associated with an application for performing database synchronization. The local portal then sets up a local database in memory at the local node as part of a database pair for use by the application. In this example, the local database includes an applicant. Further, when the neighbor portal receives the Hello LRPDU messages 401, the neighbor portal determines that the AppId is associated with an application for performing database synchronization. The neighbor portal then sets up a neighbor database in memory at the neighbor node as part of the database pair. In this example, the neighbor database includes a registrar. The local portal and the neighbor portal each associate the database pair with the target link. The local portal can then control synchronization of the local applicant database with the neighbor registrar database via the target link. Controlling synchronization of the local applicant database with the neighbor registrar database includes transmitting record information to the neighbor database via the target link in LRPDU messages as discussed below. It should be noted that LRPDU messages may always be forwarded via the target link to ensure such messages reach the appropriate portal.

Once the Hello LRPDU message exchange has occurred and the databases have been set up, the application can make a record change 405 to the applicant database via the local portal. The record change 405 includes updating at least one bit of data in a corresponding record. When a record is updated, a sequence number is changed (e.g., incremented) in a corresponding record header to denote the change. The record affected by the record change 405 can also be marked as unacknowledged by employing a flag in the applicant database to indicate the registrar is not aware of the change.

The local portal can transmit a Record LRPDU message 407 toward a registrar database at a neighbor node via the neighbor portal. The Record LRPDU message 407 indicates the updates to the record stored in an applicant database. Specifically, the Record LRPDU message 407 contains the record headers for the records updated in the applicant database by the record change 405. Such record headers include a record number and sequence number for each updated record. In some examples, the Record LRPDU message 407 also contains the updated records as well. In other examples, the updated records are transferred from the applicant to the registrar via a separate communication and/or via a separate protocol, such as TCP and/or LRP-DT. It should be noted that the local portal may continue to send additional Record LRPDU messages as records are updated without awaiting acknowledgements.

The neighbor portal, and hence the registrar, receives the Record LRPDU message 407 and updates the registrar database with the included record headers and/or records. The neighbor portal can then generate a Partial List LRPDU message 409 on behalf of the registrar. The Partial List LRPDU message 409 serves as an acknowledgement of the Record LRPDU message 407. The Partial List LRPDU message 409 contains the record headers contained in the Record LRPDU message 407, and hence indicates to that the registrar is aware of and/or has received the updates to those records, depending on the example. The neighbor portal transmits the Partial List LRPDU message 409 toward the applicant database. The Partial List LRPDU message 409, acknowledging the Record LRPDU message 407, is received at the local portal. The local portal can then mark the updated records in the applicant database as acknowledged by the registrar database by employing a flag.

As noted above, a local portal may send further Record LRPDU messages 407 without awaiting corresponding Partial List LRPDU messages 409. Hence, various record updates may remain unacknowledged even when particular Partial List LRPDU messages 409 have been received. However, in some cases all Partial List LRPDU messages 409 can be received for all corresponding Record LRPDU messages 407, for example due to a pause in updates to the applicant. When this occurs, the applicant database and registrar database are synchronized. The local portal can check the acknowledgment status of the records in the applicant database each time a Partial List LRPDU message 409 is received. Hence, when the databases are synchronized, the local portal can determine that all updated records in the applicant database have been acknowledged by the registrar database via the LRPDU messages. Based on the determination that all updated records in the applicant database are acknowledged by the registrar database via LRPDU messages, the local portal can send an all record acknowledgement 411 to notify the application that the applicant database is synchronized with the registrar database. The all record acknowledgement 411 may be an indication in the form of a predetermined code sent to the application to verify synchronization.

Optionally, the local portal can be configured to maintain a timer for each Record LRPDU message 407. In such a case, the local portal can generate a failure notification 412 to the application when a Record LRPDU message 407 timer expires without receiving a corresponding Partial List LRPDU message 409. The unacknowledged Record LRPDU message 407 may not be automatically resent by the local portal. The neighbor portal and/or the corresponding target port may include a limited receive buffer. Automatic retransmission may result in buffer overruns due to the other Record LRPDU messages 407. Accordingly, the application can determine how to proceed, for example by resending the unacknowledged Record LRPDU message 407, waiting longer, rolling back the corresponding record update to the applicant database, etc.

The neighbor portal transmits Complete List LRPDU messages 413 on behalf of the registrar. The Complete List LRPDU messages 413 include record headers for all records at the registrar database (but not the records themselves). The Complete List LRPDU messages 413 may be transmitted periodically and received by the applicant via the local portal. A Complete List LRPDU message 413 may serve as an acknowledgement of one or more previously sent Record LRPDU messages 407, for example in case a Partial List LRPDU message 409 is not received by the local portal/applicant. Further, a Complete List LRPDU message 413 can also be used by the applicant to determine when a Record LRPDU message 407 was not received by the registrar. For example, the applicant can compare the record headers in the Complete List LRPDU message 413 to the record headers in the applicant database. When the record headers in the applicant database match the record headers in the Complete List LRPDU message 413, the applicant can determine that all record updates have been received by the registrar and send an all record acknowledgement 411. When the record headers in the applicant database do not match the record headers in the Complete List LRPDU message 413, the applicant can determine certain records updates have not been received at the registrar and retransmit them.

Method 400 also manages other cases. For example, a connection interruption 415 may occur. A connection interruption 415 can result from the failure of a node or link between the target ports for the local portal and neighbor portal. A connection interruption 415 can also occur due to data traffic congestion. Hello LRPDU messages, such as Hello LRPDU messages 401 and 403 are exchanged periodically and the portals become aware of the connection interruption 415 when such an exchange fails. When the Hello message exchange fails, the local portal generates a disconnected code 416 for the application. The disconnected code 416 indicates to the application that an exchange of Hello LRPDU messages has failed and a connection interruption 415 has occurred. The applicant can then determine an action to take in response to the connection interruption 415. For example, the application can decide to reset the database pair upon reestablishing connection, in which case the method 400 restarts once Hello LRPDU messages 401 and 403 are exchanged.

As another example, the application can decide to keep the database pair and reestablish connection. When successful, this approach avoids the need to resend all records in the applicant database to the registrar database. The application can send a maintain database command 417 to the local portal. Hence, the local portal can receive the maintain database 417 command from the application to maintain the applicant database in memory at the local node despite the disconnected code 416. When the local portal receives a command to maintain the database pair, the local portal ceases sending Record LRPDU messages 407 until a Complete List LRPDU message 418 is received from the registrar database via the neighbor portal. For example, the local portal can reset notify timers at the applicant database after an unsuccessful exchange of Hello LRPDU messages (e.g., a connection interruption 415) to prevent transmission of Record LRPDU messages until the Complete List LRPDU message 418 is received.

The neighbor portal performs a similar process with an application at the neighbor node. After a successful Hello LRPDU message exchange, the registrar, via the neighbor portal, sends the Complete List LRPDU message 418. The Complete List LRPDU message 418 is substantially similar to Complete List LRPDU message 413, and hence contains all record headers for the registrar database. If either of the applications at the local node or the remote node chooses to reset the database pair, then the method 400 restarts. For example, if the neighbor portal resets the registrar database and the local portal does not reset the applicant database, then the Complete List LRPDU message 418 is empty and the applicant resends all the records. As another example, if the neighbor portal does not reset the registrar database and the local portal does reset the applicant database, then the Complete List LRPDU message 418 contains record headers that do not match the applicant database and the database pair is reset. However, if both applications elect to maintain the database pair, then the Complete List LRPDU message 418 contains record headers that are the same or similar (e.g., due to missed Record LRPDU messages 407) to the record headers in the applicant database. In this case, the applicant can determine necessary steps to regain synchronization between the database pair.

Accordingly, the local portal can receive the Complete List LRPDU message 418 from the registrar database at the neighbor node after a successful exchange of Hello messages. The Complete List LRPDU message 418 includes record headers for all records at the registrar database. The local portal and/or applicant database can then compare record headers from the Complete List LRPDU message 418 with record headers in the applicant database to resynchronize the applicant database with the registrar database. In a first case, the local portal can determine that there is no mismatch between the record headers in the applicant database and the record headers from the registrar database as included in the Complete List LRPDU message 418. In such a case, the database pair is synchronized. As such, based on the determination of no mismatch, the portal can notify the application that the applicant database is synchronized with the registrar database, for example by sending an all record acknowledgement 411. In a second case, the local portal can determine a mismatch between one or more record headers in the applicant database and one or more record headers from the Complete List LRPDU message 418. This can occur if a Record LRPDU message 407 is lost during the connection interruption 415. The portal can compare the record headers to determine which records have not been sent to the registrar database. The local portal can then transmit a Record LRPDU message 407 toward the registrar database via the neighbor portal. The Record LRPDU message 407 contains updated record headers as desired to address the mismatch. In either case, the database pair becomes synchronized without resetting the database pair and resending all the records in the applicant database.

Optionally, the local portal can also request, on behalf of the applicant, a Complete List LRPDU message 421. This allows the applicant to check for database synchronization on demand. In such a case, the local portal transmits a Request Complete List LRPDU message 419 toward the registrar database via the neighbor portal. The neighbor portal and/or registrar receives the Request Complete List LRPDU message 419 and transmits the Complete List LRPDU message 421 toward the applicant via the local portal. The Complete List LRPDU message 421 is substantially similar to Complete List LRPDU message 418 and 413. The local portal, and hence the applicant, can then receive the Complete List LRPDU message 421 from the registrar database in response to the Request Complete List LRPDU message 419. As such, the applicant can compare the record headers from the Complete List LRPDU message 421 with the record headers in the applicant database to determine if the database pair is synchronized and/or determine which records should be sent to the registrar to synchronize the database pair.

It should be noted that the LRPDU messages and notifications of method 400 are illustrated in an order to describe various example functionalities of the present disclosure. Such messages/notifications can be used in various combinations. For example, the Hello exchange of Hello LRPDU messages 401 and 403 as well as the Complete List LRPDU messages 413, 418, and 421 may occur periodically based on predefined timers as well as based on triggering events as discussed above. Further, the Record Change 405 with resulting Record LRPDU message 407 and Partial List LRPDU message 409 may occur repeatedly during normal operation of an applicant database with or without intervening actions. Further, the all record acknowledgement 411, failure notification 412, disconnected code 416 and maintain database command 417 can be triggered whenever a corresponding circumstance occurs. As such, the order of LRPDU messages and notifications in FIG. 4 is exemplary and should not be considered limiting unless otherwise specified herein.

Further, any number of LRPDUs can be strung together successively in a single LRP-DT Edge Control Protocol Data Unit (ECPDU), up to the maximum size of the layer two frame. A single LRPDU may not be split across multiple LRP-DT ECP ECPDUs. When using TCP, an LRPDU's size may be limited by a sixteen bit length field.

FIG. 5 illustrates an example encoding of a Hello LRPDU message 500, which may implement a Hello LRPDU message 401 and/or 403. As such, Hello LRPDU message 500 may be employed to maintain database pair synchronization in a native system 110 and/or 130, a proxy 210 and/or 230, a slave 240 and/or 250, and/or a database system 300.

The Hello LRPDU message 500 is encoded in a TLV format. For example, the TLV format employed herein may support data fields of up to sixty five thousand five hundred thirty five octets. The Hello LRPDU message 500 contains a Type field 501. The Type field 501 includes a length of one octet and a zero octet offset. The Type field 501 may be set to a value of one to indicate a Hello LRPDU message 500. The Hello LRPDU message 500 also contains a Length field 503. The Length field 503 includes a length of two octets and an offset of one octet. The Length field 503 may contain a two-octet integer, with the most-significant eight bits in the first octet (offset 1), that contains the length of the data field (e.g., the remainder of the message). Thus, a TLV Length field 503 of zero indicates that no data field is present. The Length field 503 of the Hello LRPDU message 500, (octets one and two, following the type field) contains the length of all of the fixed length fields plus all the TLVs in the data field.

The remaining data includes a length of zero to sixty five thousand five hundred thirty five octets with an offset of three octets at the first data field. The data field of the Hello LRPDU message 500 contains information transmitted by a single instance of a Send Hello state machine at an applicant, registrar, and/or corresponding portal. The Hello LRPDU message 500 contains a few fixed-size fields, followed by a series of TLVs within the data field. That is, the tenth octet following the TLV Length field 503 may be another LRPDU type field.

The Hello LRPDU message 500 also contains an AppId field 505. The AppId field 505 includes an AppId that identifies the application associated with the transmitting Portal. The AppId field 505 includes an Organizationally Unique Identifier (OUI) or Company Identifier (CID) with a length of three octets and an application Sub-ID with a length of one octet and an offset of three octets for a total of four octets. It should be noted that the OUI or CID owner is responsible for managing the use of the Application Sub-ID. It should also be noted that the AppId is used in a number of contexts, including in state machine variables, and not just in a Hello LRPDU message 500.

The Hello LRPDU message 500 also contains a Hello Status field 507. The Hello Status field 507 is a four-bit enumerated field, in the most-significant bits of the octet, containing one of the following values: hello status looking (hsLooking), hello status connecting (hsConnecting), and hello status connected (hsConnected). A hsLooking value can be set to indicate that a corresponding portal has not yet received a successful Complete Portal create request. A hsConnecting value can be set to indicate that a corresponding portal has received a successful Complete Portal create request and a Hello LRPDU message 500 with the hsLooking status. In this case, the Portal is ready to receive all LRPDUs. A hsConnected value can be set to indicate that a corresponding portal is up and ready to transfer application data. In this case, the Portal is allowed to transmit all LRPDUs. The Hello Status field 507 can also contain an Error Status field 508. The Error Status field 508 may include four bits of information in the least significant bits of the octet and may indicate errors such as a database overflow.

The Hello LRPDU message 500 also contains a My Portal Number field 509. The My Portal Number field 509 contains a four-octet number identifying the transmitting Portal. The identifying number is unique over all of the Portals sharing this same LRP-DT instance. This field is four octets in length because a proxy system can proxy for any number of slave systems, each of which can have a large number of target ports. Further, a proxy system can make a TCP connection to another, similar proxy system. Each proxy system employs one value of My Portal Number for each of the target ports for which the proxy system is proxying. The My Portal Number field 509 is used in other LRPDU messages to identify with which pair of target ports 141, 151, 241, and 251 and thus, portal 113, 133, 213, and 233, and ultimately with which database 120, 122, 220, and 222, a given record LRPDU, Partial List LRPDU, Complete List LRPDU, or Request Complete List LRPDU, is associated.

The Hello LRPDU message 500 also contains a Hello Time field 511. The Hello Time field 511 includes two octets representing the time to live for the Hello LRPDU message 500. The first octet of the Hello Time field 511 is the most-significant octet of a sixteen bit number of seconds (zero to sixty five thousand five hundred thirty five or thirty to sixty five thousand five hundred thirty five) that the Hello LRPDU message 500 is valid. This field may not be transmitted with a value of between one and twenty nine, inclusive.

The first four TLVs in the Hello LRPDU message 500 are one each of the My Chassis ID TLV 513, My Port ID TLV 515, Neighbor Chassis ID TLV 517, and Neighbor Port ID TLV 519, in any order. Following these comes either zero or one Application Information TLV 521.

The type field of the My Chassis ID TLV 513 is set to a value for typeMyChassisId. The data field of the My Chassis ID TLV 513 contains a value specified for transmission in the LLDP Chassis ID TLV by the LLDP instance named in the Complete Portal create request that created the Portal transmitting the My Chassis ID TLV 513. Specifically, My Chassis ID TLV 513 contains a value that identifies the local node (e.g., the machine) acting as a sender for the Hello LRPDU message 500. Such local node contains the native system or a slave system used to setup and/or maintain a database pair (e.g., containing or coupled to a local registrar, a local applicant, or both).

The type field of the My Port ID TLV 515 is set to a value for typeMyPortId. The data field of the My Port ID TLV 515 contains the same value that has been specified for transmission in the LLDP Port ID TLV by the LLDP instance named in the Complete Portal create request that created the portal transmitting the My Port ID TLV 515. Specifically, the My Port ID TLV 515 contains a value that identifies a target port on the local node attempting to setup and/or maintain a database pair (e.g., the native system or slave). The chassis ID and port ID together uniquely represent the local half of the target link for communication of LRPDU messages.

The type field of the Neighbor Chassis ID TLV 517 is set to a value for typeNeighborChassisId. The data field of the Neighbor Chassis ID TLV 517 is in the same format as the My Chassis ID TLV 513, and contains the Chassis ID of the neighbor portal to which the local portal is associated. Specifically, the Neighbor Chassis ID TLV 517 contains a value that identifies the neighbor node (e.g., the machine) acting as a destination for the Hello LRPDU message 500. The neighbor node contains the native system or a slave system used to setup and/or maintain a database pair (e.g., containing or coupled to a neighbor registrar, a neighbor applicant, or both).

The type field of the Neighbor Port ID TLV 519 is set to a value for typeNeighborPortId. The data field of the Neighbor Port ID TLV 519 is in the same format as the My Port ID TLV 515, and contains the Port ID of the neighbor portal to which the local portal is associated. Specifically, the Neighbor Port ID TLV 519 contains a value that identifies a target port on the neighbor node used to setup and/or maintain a database pair (e.g., the native system or slave). The neighbor chassis ID and neighbor port ID together uniquely represent the neighbor half of the target link for communication of LRPDU messages. Hence, the Hello LRPDU 500 represents the target link as a My Chassis ID identifying the local node, a My Port ID identifying a target port on the local node, a Neighbor Chassis ID identifying the neighbor node, and a Neighbor Port ID identifying a target port on the neighbor node.

The Application Information TLV 521 is set to a value for typeAppInfo. The data field of the Application Information TLV 521 contains information supplied by an enable portal creation request. The data is presented to the application at the destination through a portal status indication at the destination end of an LRP-DT connection. The data may be opaque and not interpreted by LRP. The Application Information TLV 521 is optional.

Accordingly, the type field 501 is one octet with an offset of zero octet, the length field 503 is two octets with an offset of one octet, the AppId field 505 is four octets with an offset of three octets, the Hello Status field 507 is one octet with an offset of seven octets, the My Portal Number field 509 is four octets with an offset of eight octets, the Hello Time field 511 is two octet with an offset of twelve octets, and remaining TLVs 513-521 are variable lengths with a starting offset of fourteen octets.

FIG. 6 illustrates an example encoding of a Record LRPDU message 600, which may implement a Record LRPDU message 407. As such, the Record LRPDU message 600 may be employed to maintain database pair synchronization in a native system 110 and/or 130, a proxy 210 and/or 230, a slave 240 and/or 250, and/or a database system 300. The Record LRPDU message 600 contains a Type field 601 and Length field 603, which are similar to Type field 501 and Length field 503, respectively. The Type field 601 may contain a value of two to indicate a Record LRPDU message 600 (e.g., typeRecordLRPDU), and the Length field 603 contains the length of the Record LRPDU message 600. The first two octets of a Record LRPDU message 600 data field is a My Portal Number field 609 that encodes the chassis ID, port ID, and appId of the transmitting Portal. This is the same value transmitted in the Hello LRPDU message 500 for the same Portal. Following this are zero or more records in a Record field 630.

Each record includes a Record Number field 631, a Sequence Number field 633, a Checksum field 635, and optionally a Data Length field 637 and an Application Data field 639. The Record Number field 631 contains data indicating a record at an application database that has been updated. The Sequence Number field 633 contains data indicating a version number and/or number of changes associated with the corresponding record. The Checksum field 635 includes error correction data, such as a two octet value computed based on the values included in the corresponding record (e.g., values in the Record Number field 631, Sequence Number field 633, Data Length field 637, and/or Application Data field 639). The Data Length field 637, when present, indicates the length of data in the corresponding record and/or the length of the Application Data field 639. The Application Data field 639, when present, contains the updated record under transmission from the applicant database to the registrar database.

Accordingly, the Record LRPDU message 600 may include one or more record numbers indicating records updated at the applicant database and one or more a sequence numbers identifying updates included in the records updated at the applicant database. Further, the Type field 601 is one octet with an offset of zero octet, the Length field 603 is two octets with an offset of one octets, the My Portal Number field 609 is four octets with an offset of three octets, and the Record field 630 is of variable length with an offset of seven octets. Also, each record contains a Record Number field 631 of four octets with an offset of zero octets, a Sequence Number field 633 of four octets with an offset of four octets, a Checksum field 635 of two octets with an offset of eight octets, a Data Length field 637 of two octets with an offset of ten octets, and an Application Data field 639 of zero to sixty five thousand five hundred twenty octets with an offset of twelve octets, where record offsets are measured from the start of the record.

FIG. 7 illustrates an example encoding of a Partial List LRPDU message 700, which may implement a Partial List LRPDU message 409. As such, Partial List LRPDU message 700 may be employed to maintain database pair synchronization in a native system 110 and/or 130, a proxy 210 and/or 230, a slave 240 and/or 250, and/or a database system 300. The Partial List LRPDU message 700 contains a Type field 701 and Length field 703, which are similar to Type field 501 and Length field 503, respectively. The Type field 701 may contain a value of three to indicate a Partial List LRPDU message 700 (e.g., typePartialListLRPDU), and the Length field 703 contains the length of the Partial List LRPDU message 700.

The first two octets of a Partial List LRPDU message 700 data field is a My Portal Number field 709 that encodes the chassis ID, port ID, and appId of the transmitting Portal. This is the same value transmitted in the Hello LRPDU message 500 for the same Portal. Following this, there are zero or more Record Headers 730, which are substantially similar to Records 630 but contain no record data. Specifically, each Record Header 730 contains a Record Number field 731, a Sequence Number field 733, and Checksum field 735, which are substantially similar to the Record number field 631, the Sequence Number field 633, and Checksum field 635, respectively. Further, the Record Number field 731 and Sequence Number field 733 include values that are added by the registrar matching corresponding values of corresponding Records 630 in the Record LRPDU message 600 (e.g., as included in the Record LRPDU message 600 by the applicant). Hence, the Record Headers 730 acknowledge receipt of the Records 630.

Hence, the Partial List LRPDU message 700 acknowledging the Record LRPDU message 600, and the Partial List LRPDU message 700 includes at least one Record Header 730 acknowledging at least one updated record 630. Further, the Record Header 730 includes a record number in a Record Number field 731 indicating the updated record (e.g., Record 630) and a sequence number in a Sequence Number field 733 identifying an update included in the updated record (e.g., Record 630).

FIG. 8 illustrates an example encoding of a Complete List LRPDU message 800, which may implement a Complete List LRPDU message 413, 418, and/or 421. As such, the Complete List LRPDU message 800 may be employed to maintain database pair synchronization in a native system 110 and/or 130, a proxy 210 and/or 230, a slave 240 and/or 250, and/or a database system 300. Complete List LRPDU message 800 contains a Type field 801 and Length field 803, which are similar to Type field 501 and Length field 503, respectively. The Type field 801 may contain a value of four to indicate a Complete List LRPDU message 800 (e.g., typeCompleteListLRPDU), and the Length field 803 contains the length of the Complete List LRPDU message 800.

The first two octets of a Complete List LRPDU message 800 data field are a My Portal Number field 809 that encodes the chassis ID, port ID, and appId of the transmitting Portal. This is the same value transmitted in the Hello LRPDUs message 500 for the same Portal. Following this are a First Record Number field 823 and a Last Record Number field 825, which are each four octets long and include the lowest record number value and the highest record number value, respectively, that are encompassed by this Complete List LRPDU message 800. For example, the First Record Number field 823 and the Last Record Number field 825 contain the first record and the last record, respectively, stored at the registrar.

Following this are zero or more Record Headers 830, which are substantially similar to Record Headers 730. However, the Record Headers 830 contain all the record headers at the registrar database as opposed to only the record headers for the acknowledged updated records. Each Record Header 830 contains a Record Number field 831, a Sequence Number field 833, and a Checksum field 835, which are substantially similar to Record Number field 731, Sequence Number field 733, and Checksum field 735, respectively.

Each Record Number 831 transmitted in an Complete List LRPDU message 800 contains a value that is greater than or equal to the value in the First Record Number field 823 and less than or equal to the value in the Last Record Number field 825. The First Record Number field 823 and Last Record Number field 825 allow the complete list of records known to a registrar to be split among more than one Complete List LRPDU message 800. The pairs of first and last record numbers in all of the Complete List LRPDU messages 800 comprises a complete list of records that can span all possible record numbers from zero through four billion two hundred ninety four million nine hundred sixty seven thousand two hundred ninety five.

FIG. 9 is a flowchart of an example method 900 of establishing a database pair, for example in a native system 110 and/or 130, a proxy 210 and/or 230, a slave 240 and/or 250, and/or a database system 300. Method 900 employs signaling from method 400, such as Hello LRPDU messages 401, 403, and/or 500. Method 900 is discussed from the perspective of a local node operating an applicant database for clarity of discussion, but may also be operated in whole or in part on a node operating a registrar (e.g., local node or neighbor node).

Method 900 begins when a local node wishes to establish a database pair for synchronization with a neighbor node. At block 901 a Hello message is received at the local node. The Hello message includes an AppId and a target link between a target port for the local node and target port for a neighbor node. When the local node is a native system, the target port is positioned on the local node. When the local node is a proxy, the target port is positioned on a slave. The Hello message can be a Hello LRPDU message such as Hello LRPDU messages 401, 403, and/or 500. Further, the Hello LRPDU message can represent the target link as a My Chassis ID identifying the local node or a corresponding slave node, a My Port ID identifying a target port on the local node or a corresponding slave node, a Neighbor Chassis ID identifying the neighbor node or a corresponding slave node, and a Neighbor Port ID identifying a target port on the neighbor node or a corresponding slave node. To complete a Hello exchange, a corresponding Hello message is also sent from the local node to the neighbor node. Such a Hello message may be substantially similar to the Hello message received at the local node with a different My Portal Number. For example, the Hello message sent from the local node contains a My Portal Number associated with the local node and the Hello message received at the local node contains a My Portal Number associated with the neighbor node. Such messages may be sent in any order.

At block 903, the local node and/or a corresponding portal determines that the AppId is associated with an application for performing database synchronization. Based on the determination that the AppId is associated with database synchronization, a local database is setup in memory at the local node at block 905. The local database is part of a database pair for use by the application. The database pair includes a neighbor database setup at the neighbor node (e.g., by a portal at the neighbor node). In some examples, the local database can include an applicant database to store local records for transmission to a registrar database in the neighbor database. In some examples, the local database includes a registrar database to receive neighbor records from an applicant database in the neighbor database. In some examples, the local database includes both an applicant database and a registrar database.

At block 907, the database pair is associated with the target link (e.g., at a native system and/or at a slave to a proxy). Such association ensures that LRPDU messages forwarded toward the applicant/registrar reach the correct portal, either because the portal is on the local node with the target port or because the target port is on a slave configured to forward such messages to a proxy containing the portal and operating on the local node.

At block 909, the local node/portal begins controlling/managing synchronization of the local database with the neighbor database via the target link. Such control can occur by transmitting record information to the neighbor database via the target link in LRPDU messages. Such record information may include records, record headers, or combinations thereof. For example, such LRPDU messages may include further Hello LRPDU messages 500, Record LRPDU messages 600, Partial List LRPDU messages 700, Complete List LRPDU messages 800, and/or any LRPDU message from method 400.

FIG. 10 is a flowchart of an example method 1000 of managing database pair synchronization, for example upon completion of method 900. Method 1000 may be operated on a native system 110 and/or 130, a proxy 210 and/or 230, a slave 240 and/or 250, and/or a database system 300. Method 1000 employs signaling from method 400. Further, method 1000 may employ LRPDU messages, such as Hello LRPDU messages 500, Record LRPDU messages 600, Partial List LRPDU messages 700, Complete List LRPDU messages 800, and/or combinations thereof. Method 1000 is discussed from the perspective of a local node operating an applicant database for clarity of discussion, but may also be operated in whole or in part on a node operating a registrar (e.g., local node or neighbor node).

At block 1001, an application changes one or more records at an applicant database. Accordingly, a portal at the local node transmits one or more Record LRPDU messages toward a registrar database at a neighbor node, for example via a neighbor portal. The Record LRPDU messages indicate updates to records stored in an applicant database at the local node, and may also include such updated records. For example, the Record LRPDU messages may include one or more record numbers indicating records updated at the applicant database and one or more a sequence numbers identifying updates included in the records updated at the applicant database. The updated records can also be marked as unacknowledged in the applicant database.

At block 1003, the portal receives one or more LRPDU messages acknowledging the Record LRPDU messages of block 1001. In some examples, the LRPDU messages acknowledging the Record LRPDU messages include a Partial List LRPDU message. The Partial List LRPDU message includes at least one record header acknowledging the at least one updated record of block 1001. The at least one record header includes a record number indicating the updated record(s) of block 1001 and a sequence number identifying update(s) included in the updated record of block 1001. In some examples, the LRPDU messages acknowledging the Record LRPDU messages can include a Complete List LRPDU message. The Complete List LRPDU message includes record headers for all records at the registrar database. Further, the Complete List LRPDU message includes a first record number field indicating the first record stored at the registrar database and a last record number field indicating the last record stored at the registrar database. Also, the record headers include record numbers indicating the records stored at the registrar database and sequence numbers identifying updates included in the records stored at the registrar database.

At block 1005, the least one updated record is marked in the applicant database as acknowledged by the registrar database based on the record headers in the Partial List and/or Complete List LRPDU message(s) of block 1003.

At block 1007, the portal/applicant may determine all updated records in the applicant database are acknowledged by the registrar database via LRPDU messages. Based on the determination of block 1007 that all updated records in the applicant database are acknowledged by the registrar database via LRPDU messages, the portal/applicant notifies the application that the applicant database is synchronized with the registrar database at block 1009.

In some cases, a Record LRPDU message may not reach the registrar and/or a Partial List LRPDU message may be dropped on the way back to the applicant. In such cases, at optional block 1011, the portal generates a failure notification to the application when a Record LRPDU message timer expires without receiving a corresponding Partial List LRPDU message.

Block 1013 is also optional. In some examples, the portal/applicant can be configured to transmit a Request Complete List LRPDU message toward the registrar database. The registrar/neighbor portal responds with a Complete List LRPDU message. As such, the portal/applicant on the local node receives a Complete List LRPDU message from the registrar database in response to the Request Complete List LRPDU message.

FIG. 11 is a flowchart of an example method 1100 of maintaining database synchronization despite connection interruption, for example after method 900 and during/after method 1000. Method 1100 may be operated on a native system 110 and/or 130, a proxy 210 and/or 230, a slave 240 and/or 250, and/or a database system 300. Method 1100 employs signaling from method 400. Further, method 1100 may employ LRPDU messages, such as Hello LRPDU messages 500, Record LRPDU messages 600, Partial List LRPDU messages 700, Complete List LRPDU messages 800, and/or combinations thereof. Method 1100 is discussed from the perspective of a local node operating an applicant database for clarity of discussion, but may also be operated in whole or in part on a node operating a registrar (e.g., local node or neighbor node).

Method 1100 begins when an exchange of Hello LRPDU messages fails, which indicates a connection interruption. At block 1101, a disconnected code is generated for the application. The disconnected code indicates that the exchange of Hello LRPDU messages has failed. This also indicates that further messages toward the neighbor node/registrar are unlikely to be received and that previous unacknowledged messages may not have reached the registrar.

The applicant can determine to reset the database pair upon reestablishment of the connection. In such case, method 900 is employed. However, the applicant may also determine to resynchronize the current applicant database with the registrar database when the connection is reestablished. In such case, at block 1103 the portal receives a command from the application to maintain the applicant database in memory at the local node despite the disconnected code.

At block 1105, the portal resets notify timers at the applicant database after the unsuccessful exchange of Hello messages. This prevents transmission of Record LRPDU messages until a Complete List LRPDU message is received after the connection is reestablished.

Hello LRPDU messages can be sent periodically in an attempt to reestablish the connection. When the registrar database receives a Hello LRPDU message after a disconnection, the registrar responds with a Complete List LRPDU message. Accordingly, at block 1107, a Complete List LRPDU message from a registrar database at the neighbor node is received by the applicant/portal after a successful exchange of Hello LRPDU messages. The Complete List LRPDU message includes record headers for all records at the registrar database.

At block 1109, the portal/applicant compares the record headers from the Complete List LRPDU message with the record headers stored in the applicant database to resynchronize the applicant database with the registrar database. Specifically, at block 1111 the portal/application determines whether there is a record mismatch between the record headers in the Complete List LRPDU message and the record headers in the applicant database.

When the portal/applicant determines a mismatch between one or more record headers in the applicant database and one or more record headers from the Complete List LRPDU message, the method 1100 proceeds to block 1113. A mismatch indicates that at least one previous Record LLRPDU message was lost. Hence, the applicant determines which record updates are not represented in the Complete List LRPDU message. At block 1113, the applicant/portal transmits one or more Record LRPDU messages toward the registrar database. The Record LRPDU messages contain updated record headers as desired to address the mismatch and synchronize the database pair.

When the portal/applicant determines there is no mismatch between the record headers in the applicant database and the record headers from the registrar database, the method 1100 proceeds to block 1115. Based on the determination of no mismatch, at block 1115 the portal/applicant can notify the application that the applicant database is synchronized with the registrar database.

FIG. 12 is a schematic diagram of an example network node 1200 for managing database synchronization according to an embodiment of the disclosure. The network node 1200 is suitable for implementing the disclosed examples/embodiments as described herein. For example, the network node 1200 may be employed to implement a native system 110/130, a proxy 210/230, a slave 240/250, combinations thereof, and/or any local node and/or neighbor node described herein. For example, the network node 1200 can implement a database system 300.

The network node 1200 comprises downstream ports 1220, upstream ports 1250, and/or transceiver units (Tx/Rx) 1210, including transmitters and/or receivers for communicating data upstream and/or downstream over a network. The network node 1200 also includes a processor 1230 including a logic unit and/or central processing unit (CPU) to process the data and a memory 1232 for storing the data. The network node 1200 may also comprise optical-to-electrical (OE) components, electrical-to-optical (EO) components, and/or wireless communication components coupled to the upstream ports 1250 and/or downstream ports 1220 for communication of data via optical or wireless communication networks. The network node 1200 may also include input and/or output (I/O) devices for communicating data to and from a user. Such I/O devices may include output devices such as a display for displaying video data, speakers for outputting audio data, etc. The I/O devices may also include input devices, such as a keyboard, mouse, trackball, etc., and/or corresponding interfaces for interacting with such output devices.

The processor 1230 is implemented by hardware and software. The processor 1230 may be implemented as one or more CPU chips, cores (e.g., as a multi-core processor), field-programmable gate arrays (FPGAs), application specific integrated circuits (ASICs), and digital signal processors (DSPs). The processor 1230 is in communication with the downstream ports 1220, Tx/Rx 1210, upstream ports 1250, and memory 1232. The processor 1230 comprises a LRP-DS module 1214. The LRP-DS module 1214 implements the disclosed embodiments described above, such as methods 400, 900, 1000, 1100, and/or any other method/mechanism described herein. Further, the LRP-DS module 1214 may transmit, receive, and/or process LLPDU messages such as Hello LRPDU messages 500, Record LRPDU messages 600, Partial List LRPDU messages 700, Complete List LRPDU messages 800, and/or combinations thereof. For example, LRP-DS module 1214 can be employed to establish a connection via Hello LRPDU messages and setup a database pair for synchronization. As another example the LRP-DS module 1214 can be employed to notify an application when all records at an applicant are acknowledged by a registrar and/or notify the application when the registrar fails to acknowledge a record update. As yet another example, the LRP-DS module 1214 can be employed to resynchronize a database pair after a disconnection without resending all of the records from the applicant to the registrar. Hence, the LRP-DS module 1214 improves the functionality of the network node 1200. Further, the LRP-DS module 1214 solves memory management problems that are specific to the computer arts. Also, the LRP-DS module 1214 effects a transformation of the network node 1200 into a different state. The LRP-DS module 1214 can be implemented as instructions stored in the memory 1232 and executed by the processor 1230 (e.g., as a computer program product stored on a non-transitory medium).

The memory 1232 comprises one or more memory types such as disks, tape drives, solid-state drives, read only memory (ROM), random access memory (RAM), flash memory, ternary content-addressable memory (TCAM), static random-access memory (SRAM), etc. The memory 1232 may be used as an over-flow data storage device, to store programs when such programs are selected for execution, and to store instructions and data that are read during program execution.

Figure 13:
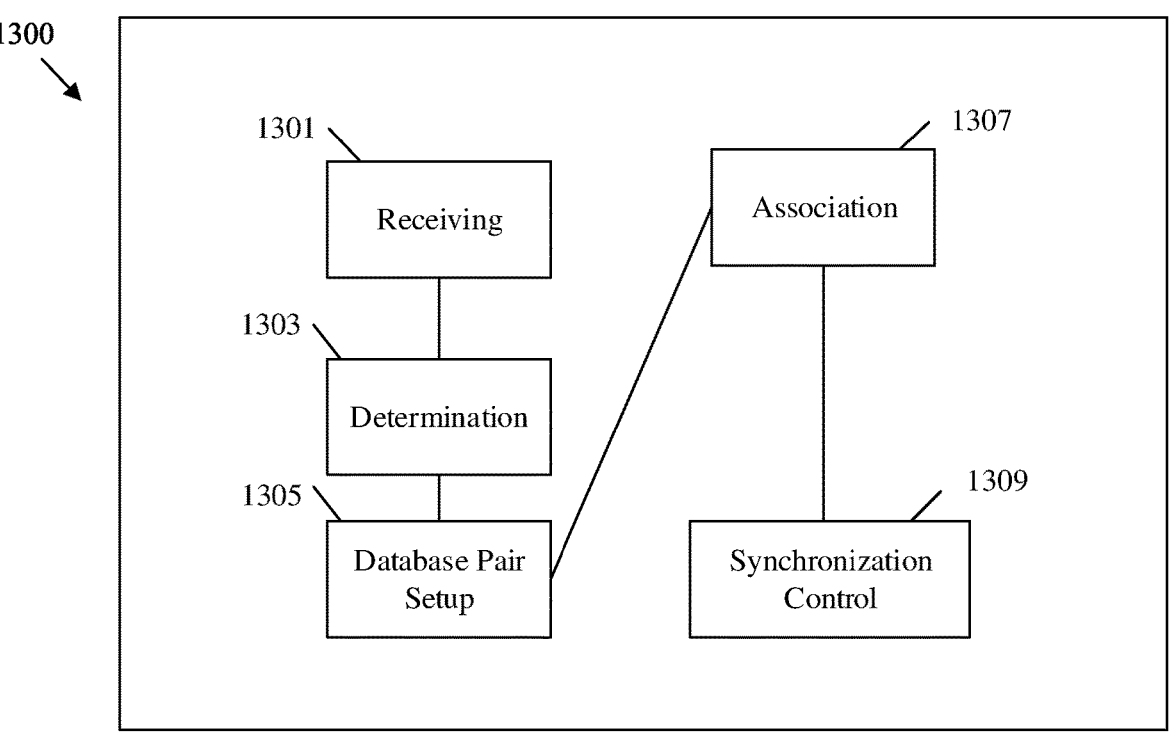
FIG. 13 is a schematic diagram of an example device for establishing a database pair.

FIG. 13 is a schematic diagram of an example device 1300 for establishing a database pair. The device 1300 can be employed to implement method 400 and/or method 900. The device 1300 includes a receiving module 1301 for receiving a Hello message including an AppId and a target link between a local node and a neighbor node. The device 1300 also includes a determination module 1303 for determining the AppId is associated with an application for performing database synchronization. The device 1300 also includes a database pair setup module 1305 for setting up a local database at the local node as part of a database pair for use by the application, the database pair including a neighbor database at the neighbor node. The device 1300 also includes an association module 1307 for associating the database pair with the target link. The device also includes a synchronization control module 1309 for controlling synchronization of the local database with the neighbor database via the target link.

Figure 14:
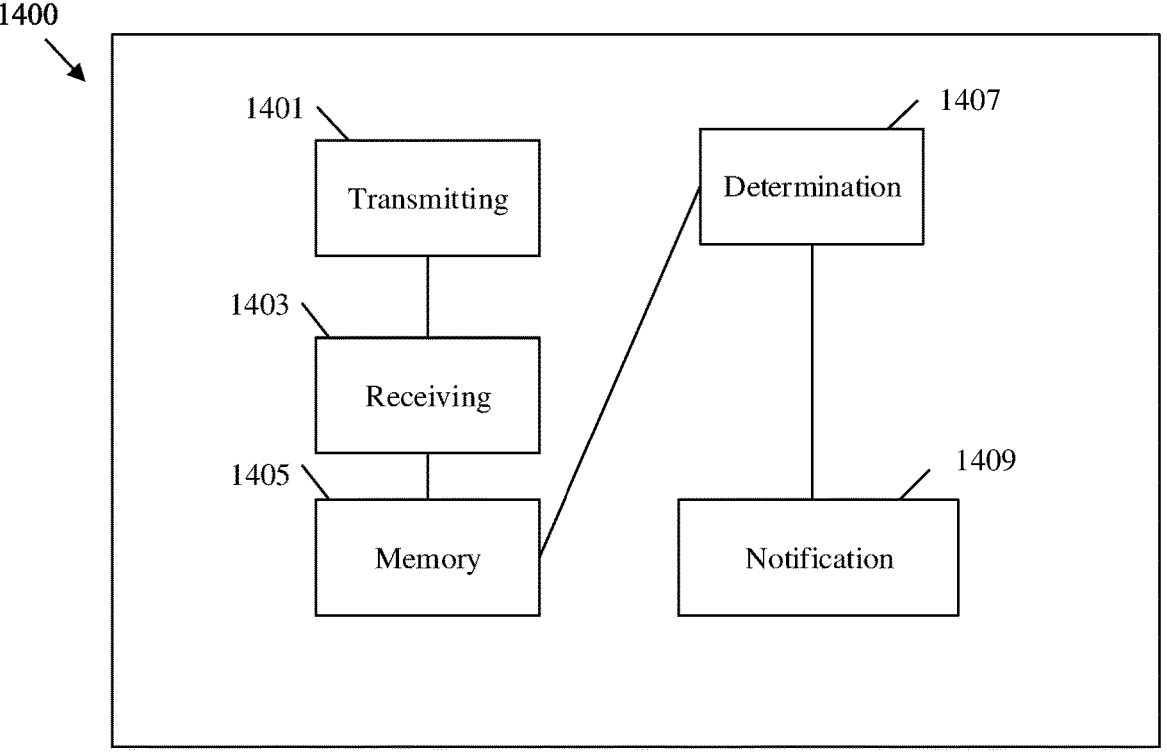
FIG. 14 is a schematic diagram of an example device for managing database pair synchronization.

FIG. 14 is a schematic diagram of an example device 1400 for managing database pair synchronization. The device 1400 can be employed to implement method 400 and/or method 1000. The device 1400 includes a transmitting module 1401 for transmitting one or more Record LRPDU messages toward a registrar database at a neighbor node, the Record LRPDU messages indicating updates to records stored in an applicant database at the local node. The device 1400 also includes a receiving module 1403 for receiving one or more LRPDU messages acknowledging the Record LRPDU messages. The device 1400 also includes a memory module 1405 for marking at least one updated record in the applicant database as acknowledged by the registrar database. The device 1400 also includes a determination module 1407 for determining that all updated records in the applicant database are acknowledged by the registrar database via LRPDU messages. The device 1400 also includes a notification module 1409 for notifying an application that the applicant database is synchronized with the registrar database based on the determination that all updated records in the applicant database are acknowledged by the registrar database via LRPDU messages.

Figure 15:
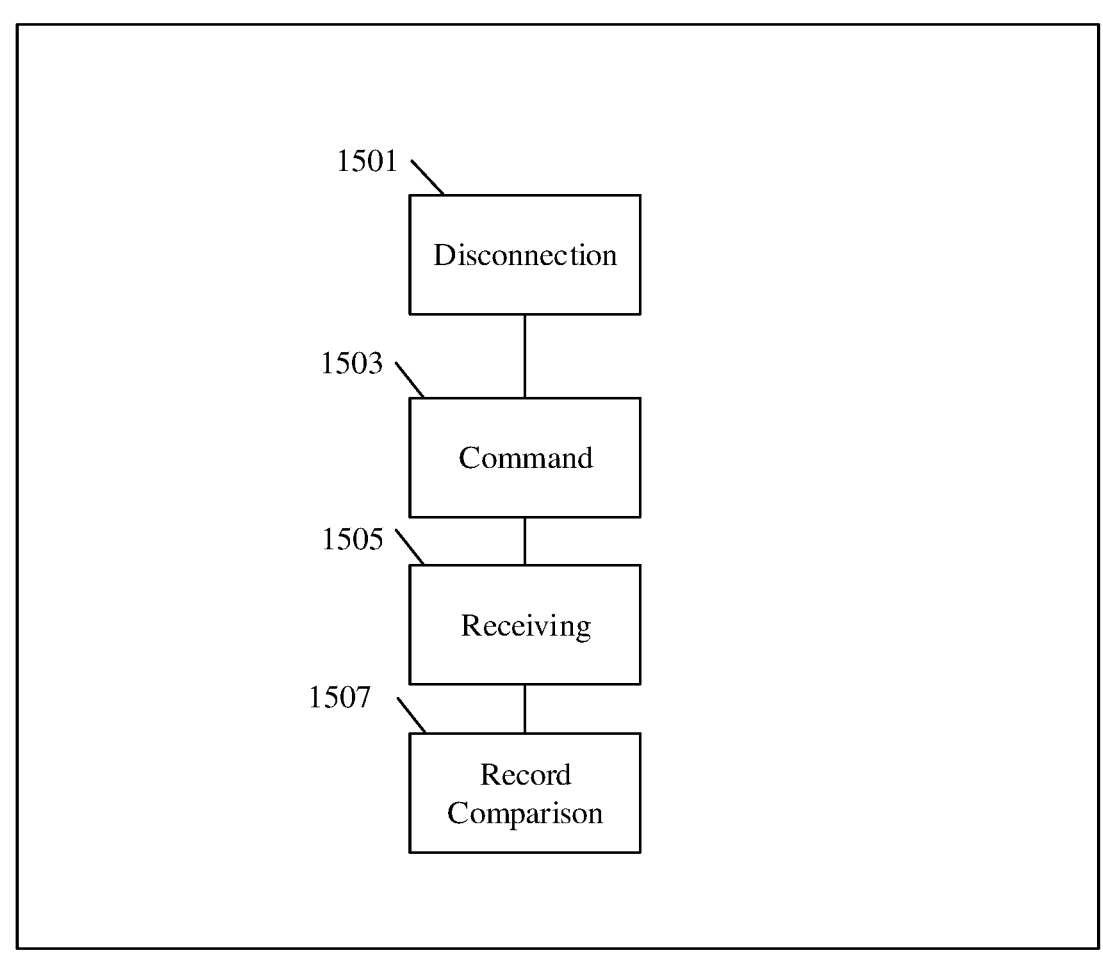
FIG. 15 is a schematic diagram of an example device for maintaining database synchronization despite connection interruption.

FIG. 15 is a schematic diagram of an example device 1500 for maintaining database synchronization despite connection interruption. The device 1500 can be employed to implement method 400 and/or method 1100. The device 1500 includes a disconnection module 1501 for generating a disconnected code for an application, the disconnected code indicating that an exchange of Hello LRPDU messages has failed. The device 1500 also includes a command module 1503 for receiving a command from the application to maintain an applicant database in memory at the local node despite the disconnected code. The device 1500 also includes a receiving module 1505 for receiving a Complete List LRPDU message from a registrar database at a neighbor node after a successful exchange of Hello messages, the Complete List LRPDU message including record headers for all records at the registrar database. The device 1500 also includes a record comparison module 1507 for comparing the record headers from the Complete List LRPDU message with record headers in the applicant database to resynchronize the applicant database with the registrar database.

In one embodiment, a node or element comprises a transmitting means for transmitting one or more Record Link-Local Registration Protocol Data Unit (LRPDU) messages toward a registrar database at a neighbor node, the Record LRPDU messages indicating updates to records stored in an applicant database at the local node as well as a receiving means for receiving one or more LRPDU messages acknowledging the Record LRPDU messages. The node or element further includes a memory means for marking at least one updated record in the applicant database as acknowledged by the registrar database. The node or element also includes a determination means for determining that all updated records in the applicant database are acknowledged by the registrar database via LRPDU messages and a notification means for notifying an application that the applicant database is synchronized with the registrar database based on the determination that all updated records in the applicant database are acknowledged by the registrar database via LRPDU messages.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other examples of changes, substitutions, and alterations are ascertainable by one skilled in the art and may be made without departing from the spirit and scope disclosed herein.

What is claimed is:

1. A method implemented in a local node, comprising:
generating a disconnected code for an application, the disconnected code indicating that an exchange of Hello Link-Local Registration Protocol Data Unit (LRPDU) messages has failed;
processing an applicant database at the local node according to the application's response to the disconnected code;
receiving a Complete List LRPDU message from a registrar database at a peer node, the Complete List LRPDU message including record headers for all records at the registrar database; and
comparing the record headers from the Complete List LRPDU message with record headers in the applicant database.

2. The method of claim 1, further comprising: resetting notify timers for the applicant database.

3. The method of claim 1, further comprising:
determining if there is a mismatch between one or more record headers in the applicant database and one or more record headers from the Complete List LRPDU message; and
transmitting a Record LRPDU message toward the registrar database, the Record LRPDU message containing updated record headers if there is a mismatch.

4. The method of claim 1, further comprising:
determining no mismatch between record headers in the applicant database and record headers from the registrar database; and
based on the determination of no mismatch, notifying the application that the applicant database is synchronized with the registrar database.

5. The method of claim 1, where the applicant database is associated with the registrar database.

6. The method of claim 1, where the Complete List LRPDU message comprises an application identifier (ApId) identifying the application.

7. The method of claim 1, wherein the Complete List LRPDU message comprises a My Chassis identifier (ID) identifying the local node, a My Port ID identifying a target port on the local node, a Neighbor Chassis ID identifying the peer node, and a Neighbor Port ID identifying a target port on the peer node.

8. The method of claim 1, further comprising:
transmitting one or more Record LRPDU messages toward the registrar database, the Record LRPDU messages indicating updates to records stored in the applicant database;
receiving one or more LRPDU messages acknowledging the Record LRPDU messages;
marking at least one updated record in the applicant database as acknowledged by the registrar database; and
notifying the application that the applicant database is synchronized with the registrar database.

9. The method of claim 8, further comprising:
determining that all updated records in the applicant database are acknowledged by the registrar database via LRPDU messages, wherein the notifying the application that the applicant database is synchronized with the registrar database is initiated based on the determination that all updated records in the applicant database are acknowledged by the registrar database via LRPDU messages.

10. The method of claim 8, wherein the LRPDU messages acknowledging the Record LRPDU messages include a Partial List LRPDU message.

11. The method of claim 10, where the Partial List LRPDU message comprises at least one record header acknowledging the at least one updated record.

12. The method of claim 11, wherein the record header includes a record number indicating the updated record and a sequence number identifying an update included in the updated record.

13. The method of claim 8, wherein the LRPDU messages acknowledging the Record LRPDU messages include a Complete List LRPDU message, the Complete List LRPDU message including record headers for all records at the registrar database.

14. The method of claim 8, wherein the Record LRPDU messages comprise one or more record numbers indicating records updated at the applicant database and one or more sequence numbers identifying updates included in the records updated at the applicant database.

15. The method of claim 1, further comprising:
generating a failure notification to the application when a Record LRPDU message timer expires without receiving a corresponding Partial List LRPDU message.

16. The method of claim 15, wherein the Complete List LRPDU message includes a first record number field indicating the first record stored at the registrar database and a last record number field indicating the last record stored at the registrar database, and wherein the record headers include record numbers indicating the records stored at the registrar database and sequence numbers identifying updates included in the records stored at the registrar database.

17. The method of claim 1, further comprising:
transmitting a Request Complete List LRPDU message toward the registrar database; and
receiving a Complete List LRPDU message from the registrar database in response to the Request Complete List LRPDU message.

18. A local node comprising:
a transmitter and a processor coupled to the transmitter, the local node configured to:
generate a disconnected code for an application, the disconnected code indicating that an exchange of Hello Link-Local Registration Protocol Data Unit (LRPDU) messages has failed;
process an applicant database at the local node according to the application's response to the disconnected code receive a Complete List LRPDU message from a registrar database at a peer node, the Complete List LRPDU message including record headers for all records at the registrar database; and
compare the record headers from the Complete List LRPDU message with record headers in the applicant database.

19. The local node of claim 18, wherein the local node is further configured to reset notify timers for the applicant database.

20. The local node of claim 18, wherein the local node is further configured to:
determine a mismatch between one or more record headers in the applicant database and one or more record headers from the Complete List LRPDU message; and
transmit a Record LRPDU message toward the registrar database, the Record LRPDU message containing updated record headers addressing the mismatch.

21. The local node of claim 18, wherein the local node is further configured to:
determine no mismatch between record headers in the applicant database and record headers from the registrar database; and
based on the determination of no mismatch, notify the application that the applicant database is synchronized with the registrar database.

22. The local node of claim 18, where the applicant database is associated with the registrar database.

23. The local node of claim 18, where the Complete List LRPDU message comprises an application identifier (AppId) identifying the application.

24. A system comprising:
a local first node;
a peer node communicating with the first node; and
wherein the first node is configured to:
generate a disconnected code for an application, the disconnected code indicating that an exchange of Hello Link-Local Registration Protocol Data Unit (LRPDU) messages has failed;
process an applicant database at the local node according to the application's response to the disconnected code;
receive a Complete List LRPDU message from a registrar database at the peer node, the Complete List LRPDU message including record headers for all records at the registrar database; and
compare the record headers from the Complete List LRPDU message with record headers in the applicant database.

\* \* \* \* \*